(12) United States Patent
Desbrandes

(10) Patent No.: US 8,391,721 B2
(45) Date of Patent: Mar. 5, 2013

(54) METHOD AND APPARATUS FOR REMOTE COMMUNICATION USING THE INTERPRETATION OF THERMOLUMINESCENCE OR PHOTOLUMINESCENCE SIGNALS

(75) Inventor: Robert Desbrandes, Givarlais (FR)

(73) Assignee: Saquant, Givarlais (FR)

( * ) Notice: Subject to any disclaimer, the term of this patent is extended or adjusted under 35 U.S.C. 154(b) by 1071 days.

(21) Appl. No.: 12/306,727

(22) PCT Filed: Mar. 26, 2007

(86) PCT No.: PCT/EP2007/052879
§ 371 (c)(1),
(2), (4) Date: Dec. 28, 2008

(87) PCT Pub. No.: WO2008/003528
PCT Pub. Date: Jan. 10, 2008

(65) Prior Publication Data
US 2009/0324217 A1    Dec. 31, 2009

(30) Foreign Application Priority Data
Jul. 4, 2006   (FR) ..................................... 06 06377

(51) Int. Cl.
*H04B 10/00*    (2006.01)
(52) U.S. Cl. ............. 398/140; 398/23; 398/24; 398/151
(58) Field of Classification Search ................ 398/9, 16, 398/23, 24, 25, 33, 36, 140, 141, 151
See application file for complete search history.

(56) References Cited

U.S. PATENT DOCUMENTS

| | | | | |
|---|---|---|---|---|
| 6,944,407 | B2 * | 9/2005 | Luryi et al. | 398/202 |
| 7,317,574 | B2 * | 1/2008 | Zoller et al. | 359/577 |
| 7,359,101 | B2 * | 4/2008 | Beausoleil et al. | 359/107 |
| 7,660,533 | B1 * | 2/2010 | Meyers et al. | 398/152 |
| 8,023,828 | B2 * | 9/2011 | Beausoleil et al. | 398/140 |
| 2004/0080011 | A1 * | 4/2004 | Starikov et al. | 257/481 |
| 2005/0254823 | A1 * | 11/2005 | Beausoleil et al. | 398/140 |

* cited by examiner

*Primary Examiner* — M. R. Sedighian

(57) ABSTRACT

A method for remote communication using the interpretation of thermoluminescence or photoluminescence signals uses a property of photoluminescence or of thermoluminescence when it is caused by entangled trapped electrons. In this case, stimulation of deexcitation of trapped electrons by heat or radiation occurs when the deexcitation thermal energy is approximately equal to the trap-emptying energy. Stimulation by a temperature rise of a "master" sample induces luminescence of a remote "slave" "entangled" sample, which is reproduced on lowering the temperature of the "master" sample whatever the distance and the media separating the "master" sample and the "slave" sample. This teaching and its generalization to other forms of stimulation is used by the method of interpreting the quantum reception measurements so as to determine, using a correlation method, the transmission of information or commands. This method is particularly suitable for carrying out communication with submarines, communication in mine galleries, or communication with space probes.

17 Claims, 13 Drawing Sheets

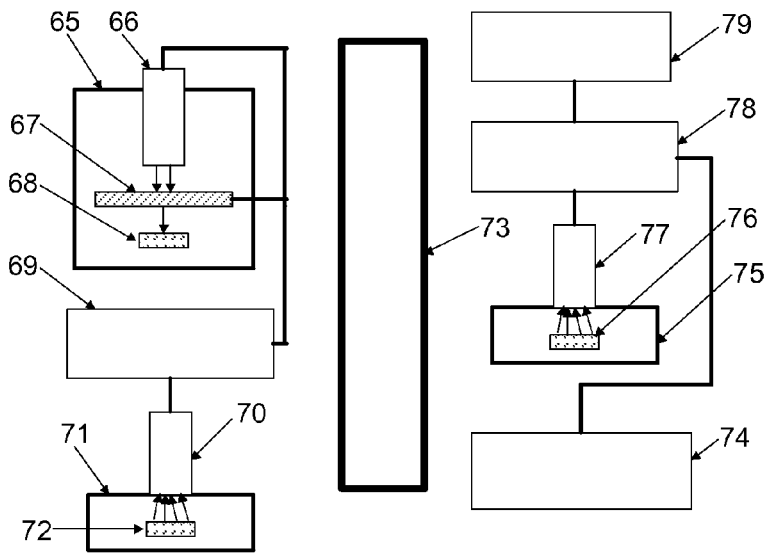
Fig. 19
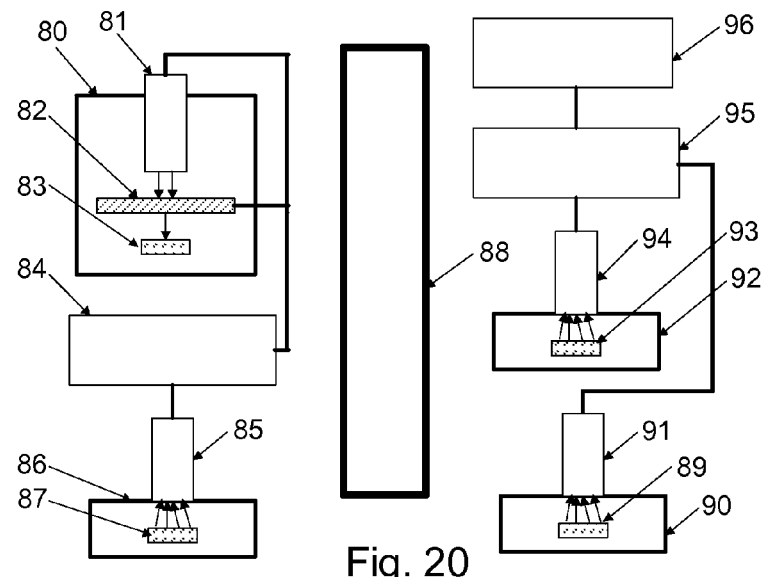
Fig. 20
Fig. 20
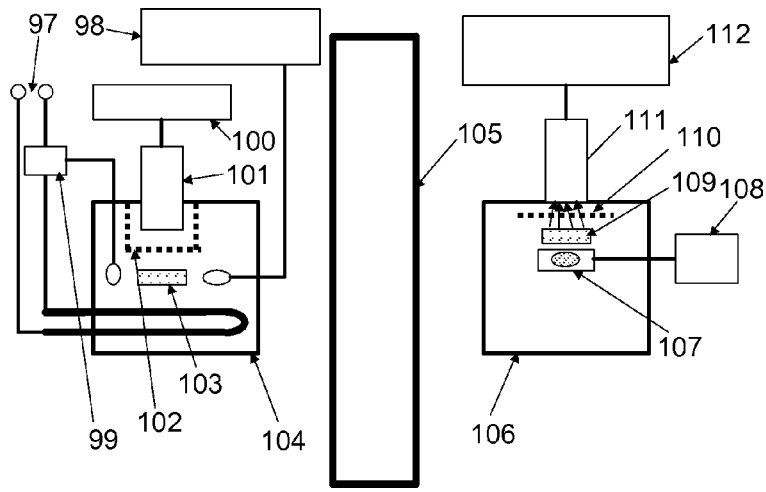
Fig. 21

METHOD AND APPARATUS FOR REMOTE COMMUNICATION USING THE INTERPRETATION OF THERMOLUMINESCENCE OR PHOTOLUMINESCENCE SIGNALS

TECHNICAL FIELD

Certain crystals become excited when they are illuminated by an irradiation of particles, gamma rays, X-rays, white or ultraviolet light. These crystals can be natural or synthetic. Their deexcitation can occur immediately in the case of the photoluminescence or be delayed in the case of thermoluminescence.

In photoluminescence [1] the energy of the photons of white or ultraviolet light is transferred to valence electrons from the molecules, which are captured by the impurities or dislocations of the crystal lattice. The deexcitation due to the return of the electrons to their orbit of valence is produced at ambient temperature with emission of visible light. The lifespan of the excited state varies with the type of molecule, the type of impurities, or dislocation, the type of doping element, and the temperature. The most current crystals contain, for example, molecules of Zinc sulfide or Strontium aluminate. They, for example, are doped with traces of metals such as Calcium, Bismuth, Copper, Manganese, Europium or Dysprosium in order to obtain various colors of luminescence. The concentration in doping atoms varies, for example from 10 to 1000 parts per million. These crystals are used and marketed in particular in the luminescent light signals. The photoluminescence thus obtained is different from phosphorescence obtained, for example by doping crystals of Zinc sulfide with traces of a radioactive product such as Uranium. In this case, luminescence is produced without preliminary excitation by an ultraviolet or visible radiation.

Thermoluminescence [2, 3, 4, 5, 6] is a physical phenomenon, which results in the property that have certain crystals to emit light when they are heated. This luminescence is produced only if the heating has been preceded by an irradiation due to ionizing radiations, for example with the exposure to the natural radioactivity during thousands of years or to the exposure to artificial gamma, X, alpha, beta, neutron, ultraviolet rays or visible light, during a few minutes or a few hours.

Thermoluminescence is used for the dating in geology, archeology and also to determine the doses of ionizing radiation undergone in a given place. These doses can be measured in a laboratory or on an individual to ensure the safety in the use of the ionizing radiations. The technique is named "dosimetry by thermoluminescence". Certain crystals like Lithium fluoride (LiF), Calcium fluoride ($CaF_2$), Lithium borate ($Li_2B_4O_7$), Calcium sulfate ($CaSO_4$), and Aluminum oxide ($Al_2O_3$), activated by traces of transition metals, rare earths or Carbon, have the property to be excited under ionizing radiations. They become luminescent by heating and the dose of ionizing radiation can be calculated. The rise in temperature by heating can be replaced by an exposure to the rays of a laser, for example infrared.

Luminescence at room temperature is not strictly null and the excitation disappears slowly in the form of fading, which is the decrease of the signal obtained in time. In the same way a fading reversion is caused to the samples stored for a long time since they are slightly irradiated by the cosmic rays and the ambient nuclear radiation. Thus, there is in this case an increase in the excitation. The fall of intensity due to fading is for example about 3% in 3 months for a crystal of Aluminum oxide doped with Carbon and at room temperature. The half-life of such a sample initially irradiated is thus approximately 5 years, i.e. the intensity of its luminescence decreases by one half in 5 years.

The phenomena of thermoluminescence are explained by the imperfect structure of the crystals, which always contain a high number of defects such as constructional defects, or gaps, or dislocations, or the presence of atoms not pertaining to the basic chemical composition (impurities), and atoms of doping. It is generally allowed that valence electrons of the crystal during the irradiation are ejected in the band of conduction and are then captured in the traps caused by the gaps, the dislocations, the atoms not pertaining to the basic chemical composition (impurities), and atoms of doping.

Several peaks of luminescence are generally obtained with materials used in dosimetry. They come from the type of traps. In minerals, the traps are generally deep and in materials of dosimetry the traps are generally less deep. More calorific or optical energy is thus necessary for deexciting the electrons of deep traps, since the depth of a trap indicates its energy level. In photoluminescence, the traps are very shallow and are emptied at room temperature under the action of the network's vibrations. This explains the variations of luminescence with the temperature.

FORMER TECHNIQUE

The international filing Nr WO 2005/117306 [7] describes a process to remotely communicate by using a product consisting in samples containing at least one kind of photoluminescent or thermoluminescent materials characterized in that groups of two or several entangled electrons present in groups of two or several traps of the aforesaid photoluminescent or thermoluminescent materials, are entangled between them and are distributed in whole or part of the aforesaid samples, called thereafter by convention "entangled" samples. These "entangled" samples form a product. They can be separated in space and present quantum couplings between some of the electrons trapped in the traps of the photoluminescent or thermoluminescent materials. The product is then used to communicate or command using a variation of the remote luminescence due to the entanglement of particles and the photoluminescence or thermoluminescence.

First of all, one separates in space whole or part from the "entangled" samples of the product containing the entangled electrons in traps of the photoluminescent or thermoluminescent materials, some of the trapped electrons being distributed on certain of these samples, and presenting quantum couplings.

One then exploits quantum couplings between the aforementioned trapped electrons of these "entangled" samples, independently of the distances, the mediums separating them and the mediums in which they are placed. One causes at least one deexcitation, called in the continuation "stimulation", modulated in amplitude and/or frequency on at least one of the aforesaid "entangled" samples, qualified the "master" sample, for example either by heating it in its totality, or by heating it in at least one spot of its surface, or by optical stimulation using at least one flash of infrared, visible, or ultraviolet light on its totality, or by optical stimulation using at least one flash of infrared, visible or ultraviolet light in at least one spot of its surface, or by a combination of these processes, the aforementioned modulated stimulation characterizing information or a command to be transmitted.

One determines, either at least one detection of information, or at least one detection of command, by means of at least one measurement made with a detector of luminescence, for example a photomultiplier or a photodiode, of at least one variation of luminescence on at least one kind of photoluminescent or thermoluminescent materials contained in at least one of the other "entangled" samples, qualified of "slave" sample, when the aforementioned variation of measured luminescence is partially correlated with the modulated stimulation applied to the aforesaid "master" sample.

The international filing Nr WO 2005/117306 [7] also describes processes for the manufacturing of the product made up of "entangled" samples. Other techniques can be implemented for obtaining products made up of improved "entangled" samples. These products can be used to implement quantum transmissions according to the process object of this invention such as it is described below.

DISCLOSED INVENTION

The present invention relates to a process and its implementation to remotely communicate or command by using photoluminescence or thermoluminescence. This process constitutes, according to the modes of the invention, a complement of the former techniques of the international filing Nr WO 2005/117306 [7].

In the theory of Quantum Mechanics, entangled particles, although being in separate physical spaces, are in same quantum space (Hilbert space) and groups of entangled particles have a common wave function [9, 10, 11, 12, 13, 14]. A theoretical representation of the property for each of the group of entangled particles can be made.

If the state vector of the entangled electron in its trap in the sample A is $|1>_A$ and the state vector of the corresponding entangled electron in its trap in the sample B is $|0>_B$, entanglement of these two states is represented by the state vector of the common wave function, which is of the form:

$$|\Psi>_{AB} = 1/\sqrt{2}(|1>_A(x)|0>_B - |0>_A(x)|1>_B)$$

(x) meaning a vector product.

This equation indicates that the states in the two samples are not defined and present one quantum coupling. The definition of one of the states of one of the electron in the sample A, for example by heating or by an exposure to an ad hoc radiation, immediately causes the collapse of the wave function and the definition of the state of the corresponding electron in the sample B. All or part of the trapped entangled electrons in the samples A and B, either would fall down together in their valence band, while emitting each a luminous photon, or would take again a normal or accelerated probability of fading emission. This would explain the emptying of the traps of the distant "slave" sample during the heating or the application of an ad hoc radiation on whole or part of the "master" sample, whose traps contain entangled electrons.

In this invention, the nature of the quantum coupling is not explained: it is also possible that models of forces or hidden variables, may explain this connection between electrons in traps of the "entangled" samples: In this explanation, the probability of emptying of the traps would be reduced as long as the connection persists. The rupture of the quantum coupling between two or several trapped electrons, which would perhaps occur by resonance during the heating or the application of an ad hoc radiation on whole or part of the "master" sample, would cause a re-establishment of the probability of fading of the electrons trapped in the "slave" samples. The entangle "slave" sample or the entangled "slave" samples would then present a transient increase in their fading, some of the "emptied" traps, which may be not very deep, generating photons with an increased probability immediately after the rupture of the connection, which is qualified by convention "quantum coupling".

In this invention, one uses the measurements of luminescence of photoluminescent or thermoluminescent materials or of a combination of both, when the variation of luminescence is caused, directly or indirectly, by a remote stimulation by means of the deexcitation of trapped and entangled electrons, in particular when the deexcited traps depend upon one or more parameters of stimulation.

In the case of thermoluminescent materials, it is known that the complete emptying of all the traps of such materials must be made by using a particular technique for each kind of materials, consisting in maintaining this or these materials at various temperatures for periods of a few minutes to several hours [Reference 5, page 215]. The present invention exploits the application to the relations between entangled traps, of this property of response to a stimulation. This invention thus consists in improving the process and the apparatus describes in international filing n° WO 2005/117306 [7] to take account of complementary phenomena concerning the emptying of the entangled traps.

In a simple mode of the process, object of this invention, at the time of the rise in temperature, the peaks of luminescence, well-known to the expert, are obtained on the "master" sample as shown in the FIG. 1. On this Figure, a sample of Lithium fluoride, doped and excited, produces a peak of luminescence at 155° C. and another peak, more important, at 230° C. FIG. 2 schematically illustrates the thermoluminescence of a doped Lithium fluoride sample, according to the temperature applied and of the measured wavelengths which lie between 300 and 700 nanometers. Some shallow traps appear at 100° C. as well as the traps seen at 155° C. and 230° C. on FIG. 1. A maximum of intensity is reached around 400 nm.

In the simple mode of the process, at the time of the rise in temperature of the "master" sample, peaks of luminescence are measured on the "slave" sample or on the "slave" samples, which are entangled with the "master" sample as shown in the FIG. 3. The amplitude of these peaks depends upon the mode of irradiation of the "entangled" samples and the speed of rise in temperature. Peaks of luminescence are also measured on the "slave" sample", at the time of the descent in temperature of the "master" sample, as illustrated on FIG. 3, the two samples having been irradiated beforehand with 2 Gray. On this Figure, the curve (1) is recorded during the rise in temperature and the curve (2) is recorded during the descent in temperature. For more clearness, the curve (2) was shifted 20 counts per second upwards. A correlation is obtained for the same temperatures. It will be noted that on this Figure, the amplitude of 1500 counts per seconds corresponds to the fading of the "slave" sample.

A possible explanation of this correlation is that the traps containing the entangled electrons are emptied more slowly and perhaps only at the temperature of the peaks. If the excursions of temperature during the rise and the descent are sufficiently fast, the same samples can be used several times since the traps containing the entangled electrons are emptied only partially with each excursion of temperature. For such a behavior, a phenomenon of resonance seems to occur since the emptying of the traps looks to cease when the temperature of the peaks of luminescence is exceeded. In this particular mode of the process, one calculates a correlation coefficient between measurements of the peaks at the time of the rise in temperature and measurements of the peaks at the time of the descent in temperature.

Each peak of luminescence of the "slave" samples can be exploited separately by limiting the rise in temperature as shown in FIGS. 4 and 5. On FIG. 4, the rise in temperature is stopped at 175° C. to exploit the first peak of luminescence. The curve (3) represents the intensity of luminescence during the rise in temperature and the curve (4) represents the intensity of luminescence during the descent in temperature. When this peak is empty, a rise in temperature as indicated on FIG. 5, makes it possible to exploit the second peak of luminescence. In the same way, the curve (5) represents the intensity of luminescence during the rise in temperature and the curve (6) represents the intensity of luminescence during the descent in temperature.

In a particular mode of the invention nonexclusive of the preceding one, part of the emptying of the traps of the "slave" sample appears by hollows of luminescence instead of peaks of luminescence. Several explanations are possible: this decrease can result from an internal conversion of the energy of the luminescence, which reduces the fading. It is also possible that during the emptying of the traps of the "master" sample, an entangled "slave" sample made up of at least one thermoluminescent material having a residual photoluminescence, presents a transient decrease in its apparent fading due to the action of the released photons from the "slave" traps previously entangled. These photons of ad hoc frequency would cancel whole or part of the residual photoluminescence of the "slave" sample according to the process, which had been highlighted in international filing Nr WO 2005/117306 [7]. FIG. 6 shows a typical example in which one exploits the preceding phenomenon: the curve (7) of rise in temperature comprises hollows of decrease in luminescence, whereas the curve (8) of descent in temperature comprises peaks of luminescence at the same temperatures. In this particular mode of the process, one calculates a coefficient of anti-correlation between measurements of hollows at the time of the rise in temperature and measurements of peaks at the time of the descent in temperature.

FIG. 7 represents the principle of a typical implementation to measure the response of the "slave" sample at the time of the rise, and then at the time of the descent in temperature of the "master" sample such as illustrated on FIG. 3. On the left of FIG. 7, the "master" sample (9) is placed in the oven (10). The temperature of the oven is measured by the digital thermometer (13). The maximum temperature of cut off is controlled by the thermostat (11), which is not re-engaged during the descent in temperature. The oven is powered with energy in (12). Behind a metal wall (14) and at any distance, the obscure room (15) contains the "slave" sample (16), which is placed opposite the photomultiplier (17). The photomultiplier is connected by a counting circuit to the computer (18) for the recording of the data. The expert can easily implement profiles of more complex variations in temperature, called thereafter "characteristic profiles", without leaving the framework of this invention. An example of such characteristic profiles consists in ad hoc excursions of temperature for the emptying of traps, peak by peak, whose measurement of luminescence is represented on FIGS. 4 and 5.

FIG. 8 shows a typical recording of the luminescence of the "slave" sample versus time, during a rise of temperature followed by a descent of temperature, which corresponds to the first simple mode of the process described above. This recording underwent a treatment depending on the optimization of the process of measurement, to eliminate the statistical variations due to the measuring device, such as the noise. An example of such a treatment consists in using a moving average. This temporal recording was corrected using the characteristic profile. The variation in temperature of the characteristic profile and the results in temperature are exposed on FIG. 3, which shows the phenomenon of correlation visually. The analytical research of the correlation can be carried out by an ad hoc method. A first example of method is presented below.

FIG. 9 shows the portion of the recording of FIG. 8, which is used for the calculation of an "instantaneous" correlation coefficient varying with time. This portion of the recording is thereafter called "modified measurements". The temporal length of this portion, called "window of calculation", was selected since it corresponds to the interval of time in relation to the characteristic profile of FIG. 10, which describes a stimulation of the "master" sample comprising the temperatures of the peaks of luminescence of the doped Lithium fluoride, which was used, and whose correlation is sought.

FIG. 10 shows the change of the temperature applied to the "master" sample versus time, which constitutes the "characteristic profile" of stimulation where, in this particular mode, the parameter varying with time is the temperature. Taking into account this "characteristic profile" makes it possible to transform measurements of luminescence versus time, in measurements of luminescence versus temperature such as illustrated on FIG. 3. Moreover, it makes it possible to calculate a second curve of temporal measurements of luminescence, known as "reversed on the time scale measurements", to connect the measurements at the same temperature, obtained in rising temperature and in decreasing temperature, according to a scale of time modified for this second curve, for example by ad hoc homotheties. This method is applied by the "quantum receiver" equipment progressively upon the availability of the measurements of luminescence, in order to calculate the "instantaneous" correlation between the "modified measurements" and the "modified reversed on the time scale measurements".

The "instantaneous" correlation calculated by this method varies during time: it is calculated, for example with each new measurement, on the new "window of calculation" comprising the most recent measurements. The two sets of measurements are represented on FIG. 11 at the moment when the two curves are superimposed almost perfectly, indicating the end of a quantum reception by the "quantum receiver", following the application of one "characteristic profile" by the "quantum transmitter". The "instantaneous" correlation is represented on FIG. 12 according to a relative time (time 0 second corresponds to an absolute time of 545 seconds on FIG. 11). The "instantaneous" correlation passes by a greatest maximum among the maximum of correlation. In practice, a criterion such as a threshold of correlation, for example of 0.70 (maximum 1.00), is used to determine a quantum reception. The threshold of correlation can be crossed during several measurements according to the optimization of the process, in particular according to the extent of the moving average or the moving averages applied to one or to several of the steps of the process. In the case of FIG. 12, the greatest maximum among the maximum reaches 0.81 and threshold of 0.70 is exceeded during 10 seconds in the typical recording presented.

A second example of a method of analytical research of the correlation is presented below. One "master" sample uses a template, illustrated on FIG. 13, which represents the typical evolution of the curve of luminescence of one "slave" sample versus time, for a stimulation of one "master" sample according to one "characteristic profile" of variation of the temperature. The "modified measurements" defined in the preceding method are correlated with the template progressively upon their availability. The "instantaneous" correlation calculated by this method varies during time: it is calculated, for example with each new measurement, on the new "window of calculation" comprising the most recent measurements. The "modified measurements" and the template are represented on FIG. 14 at the moment when the two curves are superimposed almost perfectly, indicating the end of a quantum reception by the "quantum receiver", following the application of one "characteristic profile" by the "quantum transmitter". The "instantaneous" correlation is represented on FIG. 15 according to a relative time (time 0 second corresponds to an absolute time of 545 seconds on FIG. 14). The "instantaneous" correlation passes by a greatest maximum among the maximum of correlation. In practice, a criterion such as a threshold of correlation, for example of 0.70 (maximum 1.00), is used to determine a quantum reception. As indicated previously, the threshold of correlation can be crossed during several measurements according to the optimization of the process. In the case of FIG. 15, the greatest maximum among the maximum reaches 0.92 and the threshold of 0.70 is exceeded during 15 seconds in the typical recording presented.

The calculation of "instantaneous" correlation can be carried out by one of the mathematical methods well-known to the expert, for example by a calculation of the coefficient of correlation $\rho_{X,Y}$ between two series of measured values X and Y:

$$\rho_{X,Y}=Cov(X,Y)/(\sigma_X \sigma_Y)$$

in which Cov is covariance:

$$Cov(X,Y)=(1/n)\Sigma(x_i-\mu_x)(y_i-\mu_y), \text{ for } =1 \text{ to } n$$

$\sigma_X$=Standard deviation of the values of series (x)
$\sigma_Y$=Standard deviation of the values of series (y)
$\mu_X$=Average of the values of series (X)
$\mu_Y$=Average of the values of series (Y)
n=number of measured values of series.
By definition: $-1 < \rho_{X,Y} < +1$ It will be noted that alternatives of this coefficient can be calculated, standardized or not, without leaving the framework of the invention. In the same way, methods of least square can be used as well as heuristic methods of calculation. The correlation can also be determined by means of Fourier transforms, for example by comparing the frequency spectrums obtained. In the same way, several criteria of recognition of a quantum reception, corresponding to a characteristic profile dependent upon several parameters of stimulation, can be used without leaving the framework of the invention. Processes based upon models memorizing the quantities of stimulated entangled traps and the quantities of residual entangled traps, during the application of complex characteristic profiles of stimulation, can also be used. These estimated quantities can be calculated by types of entangled traps capable of being stimulated according to the optimization of the process.

On FIG. 2, some not very deep traps appear around 100° C. as well as the traps seen on FIG. 1, which have a maximum of intensity around 400 nm. The duration of the heating is an important factor for the emptying of the traps [5]. In another mode, the duration of stimulation by a radiation of ad hoc wavelength, is also an important factor for the emptying of the traps as shown in the FIG. 2.25 of the publication referred in [4], page 54, for a doped Aluminum oxide sample. This Figure comes from reference [15]. It represents a simulation of the response in luminescence of the sample to stimulations with various wavelengths versus time. The sample comprises three types of traps. During initial stimulation, the response in intensity of luminescence is practically uniform since the not very deep traps are deexcited independently of the wavelength. When stimulation is prolonged, one distinguishes three wavelengths of stimulation for which the response is more important: these responses correspond to the three types of deeper traps.

A generalization of the principal process to remotely communicate by using the interpretation of signals of thermoluminescence or photoluminescence uses among other things: at least one group of samples comprising at least one kind of materials having properties of thermoluminescence and/or photoluminescence. This group of samples presents connections, called by convention "quantum" couplings, between trapped electrons of the aforesaid materials, for example obtained by one of the methods of illumination, irradiation, or bombardment, described in international filing Nr WO 2005/117306, or obtained by a combination of these methods. This group of samples is called by convention the group of "entangled" samples of the product. One uses moreover at least one stimulation by thermo-deexcitation or photo deexcitation. The principal process is characterized by at least one "quantum transmitter" equipment, comprising at least one entangled sample of the group, which carries out a transmission of information, called "quantum transmission", by means of a stimulation during an interval of time, either by thermo-deexcitation, or photo deexcitation, or by a combination of both, applied on whole or part of the sample, that is called "master" sample. According to the mode of operation, one applies one or successively several heuristic profiles of variation of at least one parameter of stimulation versus time, called by convention "characteristic profiles". This or these "characteristic profiles" are defined in order to transitorily modify the probability of deexcitation of some of the entangled trapped electrons, by means of an applied stimulation, and optionally by a feedback. At least one "quantum receiver" equipment, comprising at least one entangled sample of the group, carries out at least one series of measurements of luminescence in time in at least one optical wavelength or in at least one bandwidth of optical wavelengths, on the samples called the "slave" samples. One or more of the series of measurements are interpreted by at least one method of calculation of correlation, in relation to at least one property of the "characteristic profiles" used by the "quantum transmitter", to determine the reception of at least one information, coded by this or these "characteristic profiles". This reception is called a "quantum reception".

In a particular mode of the preceding mode, the process uses at least one "characteristic profile" comprising a variation of a parameter of stimulation in order to exploit at least one peak of luminescence characteristic of at least one kind of materials having some properties of thermoluminescence.

In another particular mode of the principal process, one uses at least one "characteristic profile, comprising either a variation of the parameter of temperature, or a variation of the parameter of light intensity, or a variation of the parameter of incident wavelength, or a variation of the parameter of stimulated surface, or a variation of the parameter of stimulated volume, or a combination of these variations of parameters, in order to transitorily modify the probability of deexcitation of some of the entangled trapped electrons according to one or several of the parameters.

In another particular mode of the principal process, one uses a "characteristic profile" comprising at least one variation of the temperature versus time in one or more steps, either of a temperature rise, or of a temperature decrease, or of the maintenance of the temperature, or a combination of whole or part of these steps, in order to transitorily modify the probability of deexcitation of some of entangled trapped electrons for the temperatures applied, according to the "characteristic profile", during the stimulation.

In another particular mode of the principal process, one uses a "characteristic profile" comprising at least one variation of the light intensity versus time in one or more steps, either of an increase of the aforesaid light intensity, or of a decrease of the aforesaid light intensity, or of the maintenance of the aforementioned light intensity, or a combination of whole or part of these steps, in order to transitorily modify the probability of deexcitation of some of the entangled trapped electrons for the light intensities applied, according to the "characteristic profile", during the stimulation.

In another particular mode of the principal process, one uses a "characteristic profile" comprising at least one variation of the incident wavelength versus time, for example ranging between 300 nm and 800 nm, in one or more steps, either of an increase of the aforesaid wavelength, or of a decrease of the aforesaid wavelength, or of the maintenance of the aforesaid wavelength, or a combination of whole or part of these steps, in order to transitorily modify the probability of deexcitation of some of the entangled trapped electrons for the incident wavelengths applied, according to the "characteristic profile", during stimulation.

In another particular mode of the principal process, one uses a "characteristic profile" comprising at least one variation of the surface stimulated versus time in one or more steps, either of an increase of the aforesaid stimulated surface, or of a decrease of the aforesaid stimulated surface, or of the maintenance of the aforesaid stimulated surface, or a combination of whole or part of these steps, in order to transitorily modify the probability of deexcitation of some of the entangled trapped electrons on the surface stimulated, according to the "characteristic profile", during the stimulation.

In another particular mode of the principal process, one uses a "characteristic profile" comprising at least one variation of the volume stimulated versus time in one or more steps, either of an increase of the aforesaid stimulated volume, or of a decrease of the aforesaid stimulated volume, or of the maintenance of the aforesaid stimulated volume, or a combination of whole or part of these steps, in order to transitorily modify the probability of deexcitation of some of the entangled trapped electrons on the volume stimulated, according to the "characteristic profile", during the stimulation.

In another particular mode of the principal process, one uses measurements of luminescence, in at least one optical wavelength or at least one bandwidth of optical wavelengths, carried out on at least one "slave" sample, by correcting them on the time scale according to a model taking into account the probabilities of deexcitation of the entangled trapped electrons in the "slave" sample, at the time of the collapse of the "quantum" couplings resulting from the application of the "characteristic profile" of stimulation to at least one "master" sample.

In another particular mode of the principal process, one adjusts the temperature of at least one "slave" sample measured in the "quantum receiver" in order to optimize the response of deexcitation of the entangled traps of one or several of the "slave" samples at the time of the "quantum reception".

In another particular mode of the principal process, one uses "characteristic profiles" of short durations, for example ranging between 1 microsecond and 100 milliseconds, in order to reduce the rate of entangled traps deexcited during the application of one or several of the "characteristic profiles". This or these "characteristic profiles" are more particularly applicable to the stimulation by photo deexcitation, either in a variation of the wavelength, or in a variation of the intensity, or in variation of surface, or by combinations of these stimulations.

In another particular mode of the principal process, one uses at least one "characteristic profile", in the "quantum transmitter", which comprises at least one first step of variation of at least one parameter of stimulation and at least one second step of variation of the same parameter with at least common values or a range of common values. The method of calculation of correlation uses at least one transformation of the series of measurements, in relation with the "characteristic profile", to calculate, for example by interpolation, at least one new first series of measurements whose X-coordinate is expressed in the unit of the parameter of stimulation, in relation to at least the first step of variation. At least another transformation of the series of measurements, in relation to the "characteristic profile", makes it possible to calculate, for example by interpolation, at least one new second series of measurements whose X-coordinate is expressed in the unit of the parameter of stimulation, in relation with at least the second step of variation. At least one value of correlation is calculated between the new first series of measurements and the new second series of measurements, in order to determine the reception of at least one information, that is coded by one or several of the "characteristic profiles".

In another particular mode of the principal process, called mode "of interpretation per temporal correlation", one or several of the series of measurements are interpreted to determine the transmission of at least one data by one or several of the aforesaid "characteristic profiles", by research, either of at least one greatest maximum among the maxima of correlation characterizing at least one correlation, or of at least one smallest minimum among the minima of correlation characterizing at least one anti-correlation, or of at least one greatest maximum among the maxima of correlation and of at least one smallest minimum among the minima of correlation, characterizing at least one correlation and one anti-correlation, over the duration of one or several aforesaid "characteristic profiles". The "instantaneous" correlation is calculated, either at predetermined times, or continuously, or over intervals of time, these times or these intervals being possibly known by the "quantum transmitter" and by the "quantum receiver" in a partially or completely synchronized secondary mode, or according to a combination of these methods, on at least one temporal window, possibly moving, dimensioned in relation to at least one property of one or several aforesaid "characteristic profiles". The "instantaneous" correlation, when it is standardized, ranges between the value "−1" and "+1", and it is evaluated, according to the mode, for example by one of the following methods:

1—by a method of correlation (M1) between the series of measurements, possibly after application of a transformation, and a template.
2—by a method of correlation (M2), when the information is coded by the "quantum transmitter" by at least two "characteristic profiles" shifted of at least one known value of time by the "quantum transmitter" and by the "quantum receiver", between the series of measurements and the series of measurements shifted on the time scale, possibly after application of a transformation.
3—by a method of correlation (M3), when the information is coded by the "quantum transmitter" by at least one "characteristic profile" making it possible to put in correspondence at least one ensemble of values of at least one parameter of stimulation which are applied at different times, between the series of measurements, and the series reversed on the time scale, possibly after application of a transformation.

4—by a method of correlation (M4) between the series of measurements on at least two measured "slave" samples.

5—by a method of correlation (M5) between at least two of the series of measurements on at least one "slave" sample measured, for example in at least two optical wavelengths or at least two bandwidths of optical wavelengths or at least one optical wavelength and at least one bandwidth of optical wavelengths, possibly after application of transformations.

6—or by a combination of these methods.

One or several of the greatest maximum among the maxima of correlation when they are higher than a threshold of confidence depending upon the optimization of the process, for example "+0.7", and one or several of the smallest minimum among the minima of correlation when they are lower than a threshold of confidence depending upon the optimization of the process, for example "−0.7", characterize at least one quantum reception of a data encoded according to one or several of the "characteristic profiles".

In another particular mode of the preceding mode "by interpretation by temporal correlation", more particularly applicable to the secondary mode using method (M1), the "instantaneous" correlation is calculated between:

1—the series of measurements of the "quantum receiver" or a function of measurements, when several "slave" samples are employed, for example using a weighted average, the result being called the series of raw measurements. This series of raw measurements can undergo a transformation applied to a subset of raw measurements, for example one moving average applied for a fraction of the duration of one or several of the "characteristic profiles", or a transformation correcting the effect of the "characteristic profile", the resulting measurements being called the "series of modified measurements".

2—and a template of response of deexcitation of entangled traps, which was calibrated beforehand for one or several of the "characteristic profiles" used, and, either the "slave" sample used, or a typical "slave" sample , or calibrated by means of an heuristic calculation using at least one response curve of thermoluminescence or photoluminescence of the kind of materials and one or several of the "characteristic profiles", or calibrated by a combination of these means.

In another particular mode of the mode "of interpretation per temporal correlation", more particularly applicable to the secondary mode using the method (M2), one employs predetermined values of time of shifts which are either fixed, or pseudo random according to same seed, the "instantaneous" correlation being calculated between:

1—the series of measurements of the "quantum receiver" or a function of measurements, when several "slave" samples are measured, for example using a weighted average, the result being called the series of raw measurements. This series of raw measurements can undergo a transformation applied to a subset of raw measurements, for example one moving average to a fraction of the duration of one or several of the "characteristic profiles", or a transformation correcting the effect of one or several of the "characteristic profiles", these resulting measurements being called the "series of modified measurements".

2—and the series of raw measurements defined above, shifted on the time scale of one or several of the predetermined values of time, this series of raw measurements possibly undergoing a transformation applied to a subset of raw measurements, for example a moving average over a fraction of the duration of one or several of the "characteristic profiles", or a transformation correcting the effect of one or several of the "characteristic profiles", the aforementioned resulting measurements being called the "series of shifted modified measurements". These transformations make it possible to establish a correspondence between the same values of the parameters of stimulation, correspondence which appears between measurements at the time of a "quantum reception".

In another particular mode of the mode "of interpretation per temporal correlation", more particularly applicable to the secondary mode using the method (M3), the "instantaneous" correlation is calculated between:

1—the series of measurements of the "quantum receiver" or a function of the measurements, when several "slave" samples are measured, for example using a weighted average, the result being called the series of raw measurements. This series of raw measurements can undergo a transformation applied to a subset of the measurements, for example one moving average over a fraction of the duration of one or several of the "characteristic profiles", or a transformation correcting the effect of one or several of the "characteristic profiles", these resulting measurements being called the "series of modified measurements".

2—and the series of raw measurements, possibly modified according to the optimization of the process, this series of measurements being reversed on the time scale. This news series of raw measurements can undergo a transformation applied to a subset of the measurements, for example one moving average over a fraction of the duration of one or several of the "characteristic profiles", or a transformation correcting the effect of one or several of the "characteristic profiles", these resulting measurements being called the "series from reversed measurements". These transformations are applied in order to establish a correspondence between the same values of the parameters of stimulation, correspondence which appears between the measurements at the time of a "quantum reception".

In another particular mode of the mode "of interpretation per temporal correlation", more particularly applicable to the secondary mode using the method (M4), the "instantaneous" correlation is calculated between:

1—the series of measurements on the first "slave" sample of "quantum receiver" or a function of measurements of a first group of "slave" samples, when several "slave" samples are measured, for example using a weighted average, the result being called the first series of raw measurements. This first series of raw measurements can undergo a transformation applied to a subset of measurements, for example one moving average applied on a fraction of the duration of one or several of the "characteristic profiles", these resulting measurements being called the "first series of modified measurements".

2—and the series of measurements on the second "slave" sample of the "quantum receiver" or a function of the measurements of a second group of "slave" samples disjoined from the precedent, when several "slave" samples are measured, for example using a weighted average, the result being called the second series of raw measurements. This second series of raw measurements can undergo a transformation applied to a subset of the measurements, for example one moving average applied on a fraction of the duration of one or several of the "characteristic profiles", the resulting measurements being called the "second series of modified measurements".

In another particular mode of the mode "of interpretation per temporal correlation", more particularly applicable to the secondary mode using method (M5), the "instantaneous" correlation is calculated between:

1—the series of measures within the first optical wavelength or bandwidth of optical wavelengths, from the "quantum receiver" or a function of the measurements, when several "slave" samples are measured, for example using a weighted average, the result being called the series of raw measurements. This series of raw measurements can undergo a transformation applied to a subset of the measurements, for example one moving average applied on a fraction of the duration of one or several of the "characteristic profiles", or an heuristic transformation standardizing these measurements for one or several of the "characteristic profiles" in relation to the various measured wavelengths, the resulting measurements being called the "first series of modified measurements".

2—and the series of measures within the second optical wavelength or bandwidth of optical wavelengths, from the "quantum receiver" or a function of the measurements, when several "slave" samples are measured, for example using a weighted average, the result being called the series of raw measurements. This series of raw measurements can undergo a transformation applied to a subset of the measurements, for example one moving average applied on a fraction of the duration of one or several of the "characteristic profiles", or an heuristic transformation standardizing the measurements for one or several of the "characteristic profiles" in relation to the various measured wavelengths, the resulting measurements being called the "second series of modified measurements".

In another particular mode of the mode "of interpretation per temporal correlation", the "quantum receiver" takes measurements of luminescence versus time on at least two optical wavelengths or at least two bandwidths of optical wavelengths or at least one optical wavelength and a bandwidth of optical wavelengths. These measurements make it possible to determine the transmission of information at the time of the encountering on the same interval of time, either of at least two greatest maximum among the maxima of correlation, or of at least two smallest minimum among the minima of correlation, or of at least one greatest maximum among the maxima of correlation and of at least one smallest minimum among the minima of correlation.

In another particular mode of the mode "of interpretation per temporal correlation", at least one entangled sample "slave", when it is made up of at least one kind of materials having the properties of thermoluminescence, and presenting some additional properties of photoluminescence, is exposed to an infrared radiation in order to cancel the possible residual photoluminescence before being used for the "quantum reception". This suppression makes it possible to improve the quantum reception by searching of a greatest maximum among the maxima of correlation, during the application of at least one "characteristic profile".

In another particular mode of the mode "of interpretation per temporal correlation", more particularly applicable when the periods of "quantum transmission" and "quantum reception" are synchronized, at least one entangled "slave" sample, when it is made up of at least one kind of materials having the properties of thermoluminescence, and presenting some additional properties of photoluminescence, is exposed to a source of very low intensity of visible, ultraviolet light or X, to induce a residual photoluminescence, before each "quantum reception". This residual photoluminescence makes it possible to determine the transmission of information by the search for one smallest minimum among the minima, during the application of one "characteristic profile".

In another particular mode of the principal process, the "characteristic profiles" are applied by one or several of the "quantum transmitters" to predetermined moments or to predetermined temporal windows, possibly variable according to a common pseudo-random law. Such predetermined moments or to predetermined temporal windows are also known of one or several of the "quantum receivers" which applies the process of determination of a transmission of encoded data at least to the aforesaid predetermined moments or during the aforesaid predetermined temporal windows.

In another particular mode of the principal process, the "quantum transmitter" carries out a feedback while using at least one other "slave" sample and a process of measurement of luminescence in at least one optical wavelength or at least one bandwidth of optical wavelengths on this other "slave" sample. This process of measurement makes it possible to control by an heuristic method the response of deexcitation of entangled traps to at least one value of at least one parameter of the "characteristic profile" of the stimulation versus time, by feedback and modulating in complement the stimulation of the "characteristic profile" applied to the "master" sample. Feedback can for example include, either a possible complementary variation to the parameter of temperature, or a possible complementary variation to the parameter of light intensity, or a possible complementary variation to the parameter of incident wavelength, or a possible complementary variation to the parameter of stimulated surface, or a possible complementary variation to the parameter of stimulated volume, or a combination of these complementary variations to parameters of the "characteristic profile" applied to the "master" sample. This feedback makes it possible to optimize statistically the response of at least one "slave" sample of at least one distant "quantum receiver".

In another particular mode of the principal process, the "quantum transmitter" carries out a feedback by using a process of measurement of luminescence in at least one optical wavelength or at least one bandwidth of optical wavelengths on the "master" sample. This process of measurement makes it possible to control by an heuristic method the response of deexcitation of the traps at least one value of at least one parameter of the "characteristic profile" of stimulation versus time, by feedback and modulating in complement the stimulation of the "characteristic profile" applied to the "master" sample. Feedback can for example include, either a possible complementary variation to the parameter of temperature, or a possible complementary variation to the parameter of light intensity, or a possible complementary variation to the parameter of incident wavelength, or a possible complementary variation to the parameter of stimulated surface, or a possible complementary variation to the parameter of stimulated volume, or a combination of these complementary variations to parameters of the "characteristic profile" applied to the "master" sample. This feedback makes it possible to optimize statistically the response of at least one "slave" sample of at least one distant "quantum receiver".

Another particular mode of the principal process, called "multiple masters process", is defined where at least one same sample, called by convention "slave", has been entangled successively with several samples or groups of samples, called by convention "master". In this mode, one repeats several times the principal process, by using one after the other at least one "master" samples in the "quantum transmitter", and at least one of the aforesaid "slave" samples in the "quantum receiver". This repetition of the process allows to carry out several determinations of transmission of information by replacing the "master" sample when the emptying of "entangled" trapped electrons of the "master" sample is either partial compared to a threshold of quality, or is complete.

In another particular mode of the principal process, one uses at least one kind of photoluminescent materials presenting at very low temperatures, ranging between −273° C. and 0° C., some of the properties of thermoluminescence.

In another particular mode of the principal process, one calculates at least one moving average, possibly weighted, on a fraction of one or several of the "characteristic profiles". This calculation makes it possible to integrate or minimize, either the disturbances due to the noise of measurement (dark count), or disturbances due to the cosmic rays, or electromagnetic disturbances, or combinations of these disturbances, in order to optimize the signal of the response of at least one measured "slave" sample, during the variation of at least one parameter of stimulation of at least one "master" sample.

SUMMARY DESCRIPTION OF THE DRAWINGS

FIG. 1 represents the response of luminescence during the heating of doped Lithium fluoride samples, which were irradiated to 2 Gray by the gamma rays of a linear accelerator.

FIG. 2 schematically represents the response of luminescence in term of wavelength during the heating of doped Lithium fluoride samples FIG. 3 represents the typical response of a test of rise and descent in temperature limited to 245° C.

FIG. 19 represents an implementation of the invention to measure the response of the "slave" sample at the time of the rise in temperature of the "master" sample. A second "slave" sample is used to optimize the rise in temperature. A template makes it possible to obtain the coefficient of correlation during the measurement.

FIG. 20 represents an implementation of the invention to measure the response of two "slave" samples at the time of the rise in temperature of the "master" sample, in order to have a better signal to noise ratio. A second "slave" sample is to be used to optimize the rise in temperature by controlled irradiation.

FIG. 21 represents an implementation of the invention to measure the response of the "slave" sample and the "master" sample at the time of the rise in temperature, the "slave" sample being maintained at the optimal temperature.

Figure 22:
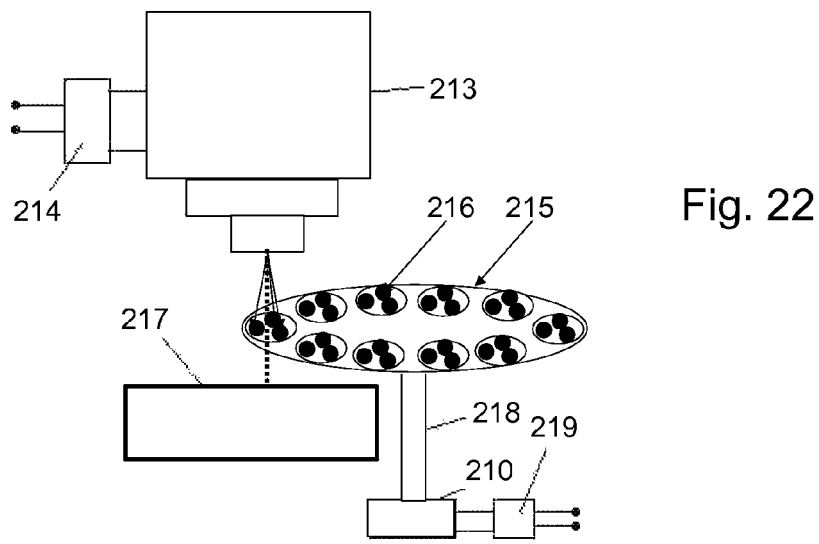

FIG. 22 represents an implementation of the irradiation of a plurality of samples on a revolving tray in order to entangle these samples.

Figure 23:
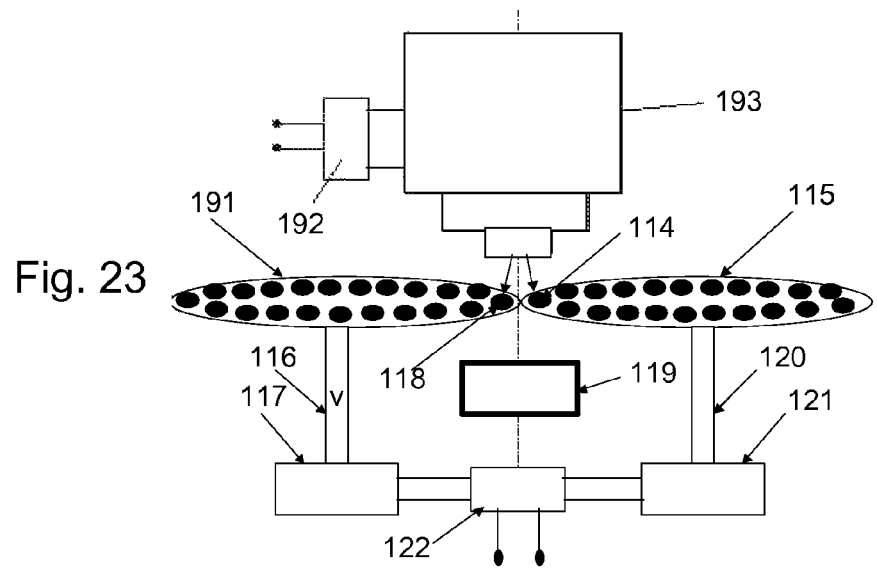

FIG. 23 represents an implementation of the irradiation of a plurality of samples on two revolving trays in order to entangle these samples.

Figure 24:
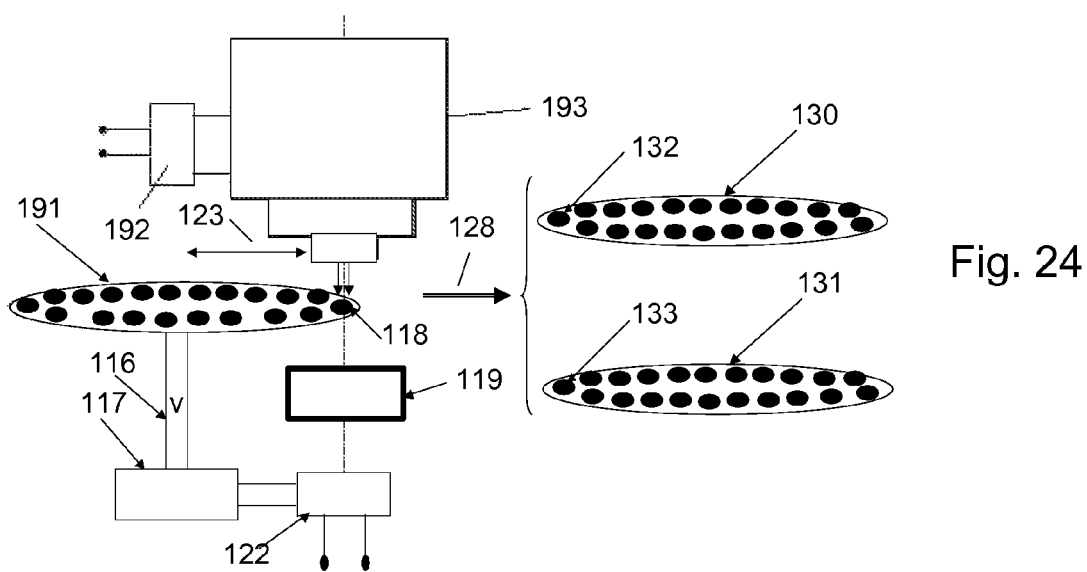

FIG. 24 represents an implementation of the irradiation of a plurality of samples on a revolving tray, two discs being obtained by subdivision and presenting samples entangled two by two.

Figure 25:
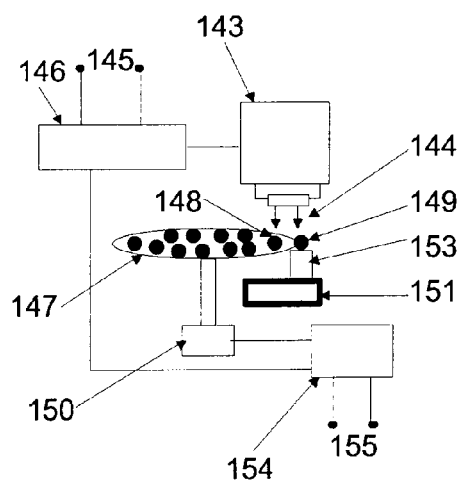

FIG. 25 represents an implementation of the simultaneous irradiation of a plurality of samples on a revolving tray of which one is simultaneously irradiated with a "single" sample by a generator providing an entangled beam in order to partly entangle the "single" sample with a plurality of samples of the tray.

Figure 26:
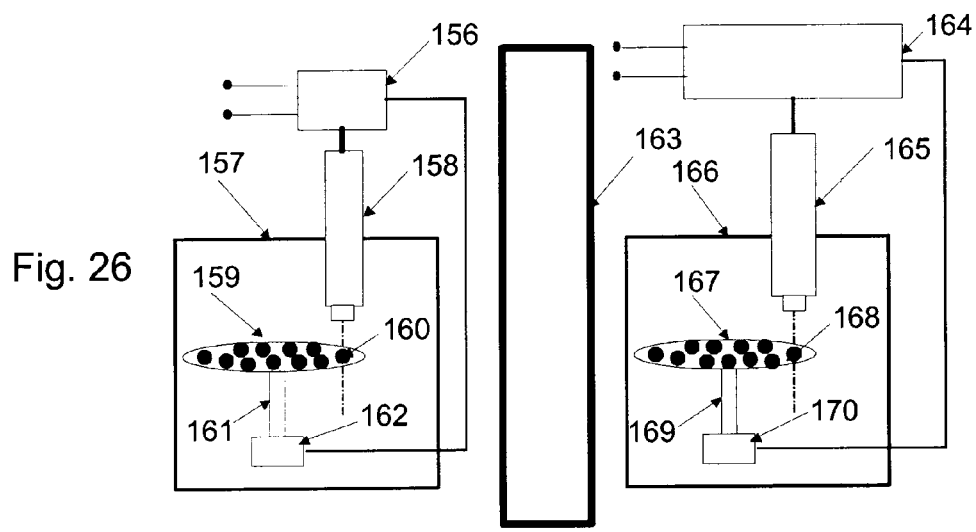

FIG. 26 represents an implementation of a mode of realization of the invention to measure the response of a "slave" sample on a tray, one "master" sample being deexcited by stimulation on the another tray.

Figure 27:
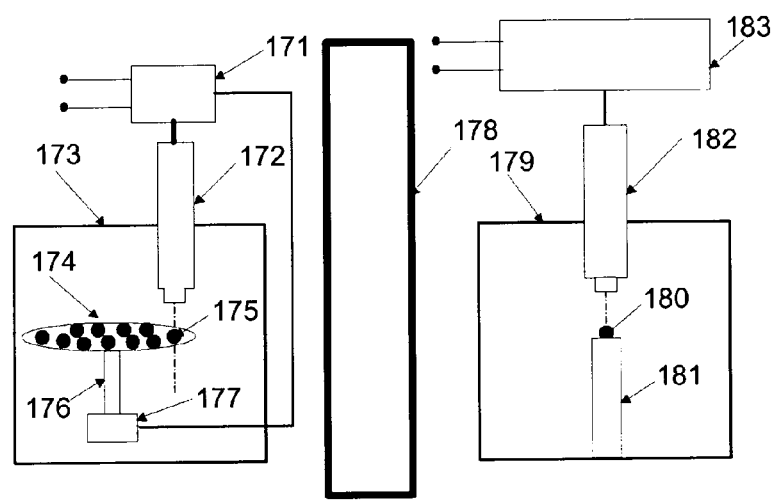

FIG. 27 represents an implementation of a mode of realization of the invention to measure the response of a "single" "slave" sample, to receive the signals of the "master" samples, which are positioned on a tray, said "master" samples being deexcited successively by stimulation.

Figure 28:
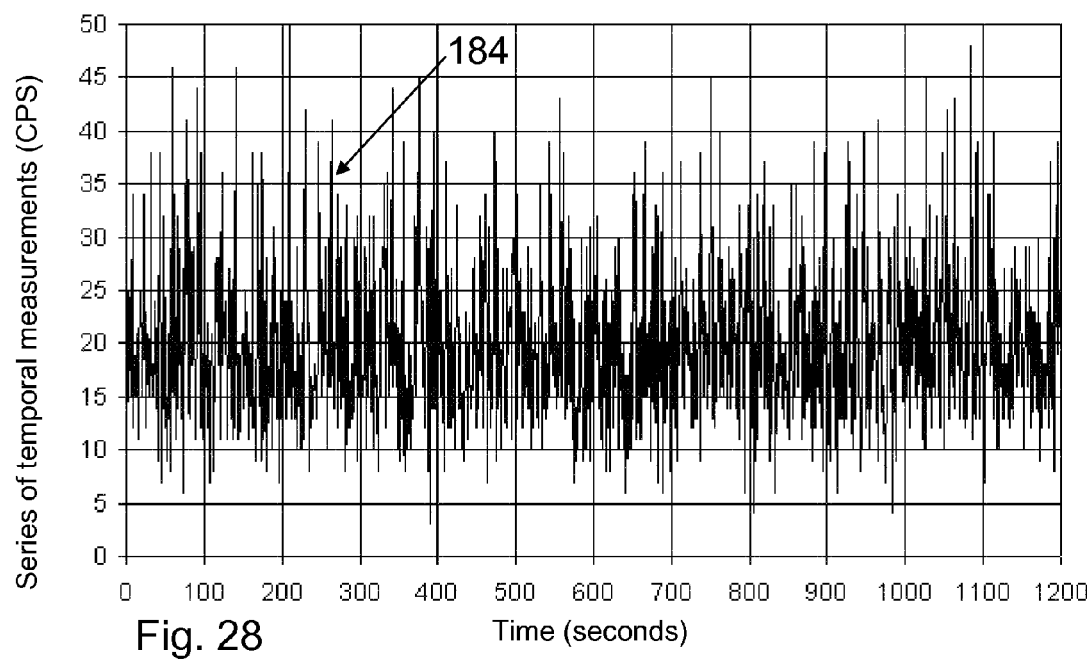

FIG. 28 illustrates an implementation of a mode of realization of the invention in which a series of temporal measurements is carried out on the "slave" sample in France, at the time of the rise and descent in temperature of the "master" sample in the United States.

Figure 29:
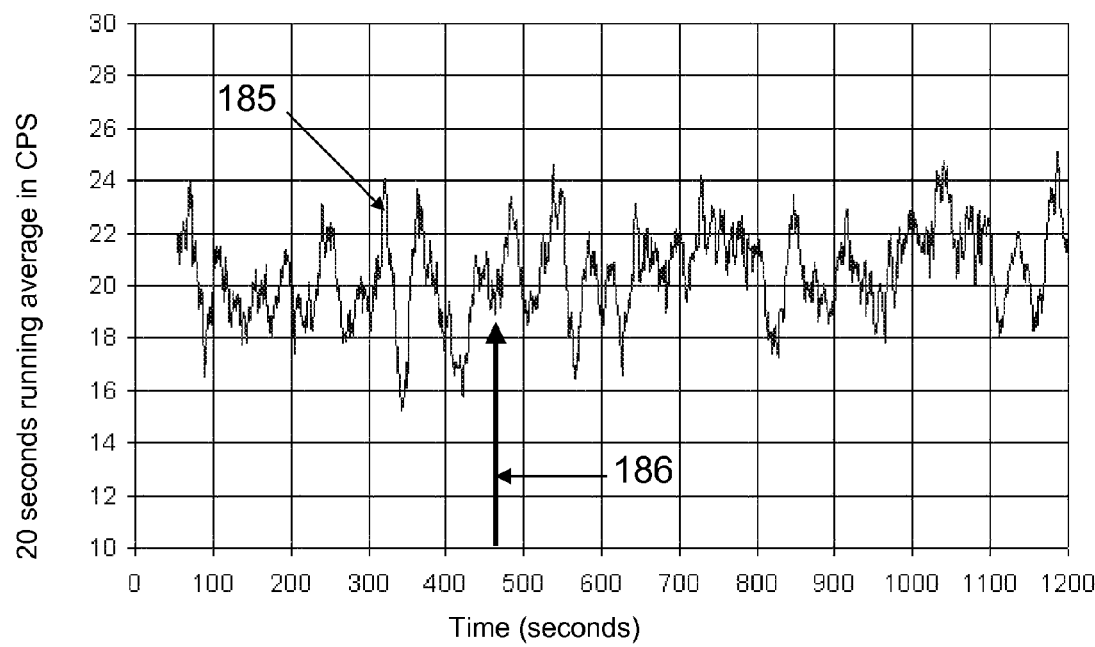

FIG. 29 represents the moving average over 20 seconds of the series of the previous temporal measurements.

Figure 30:
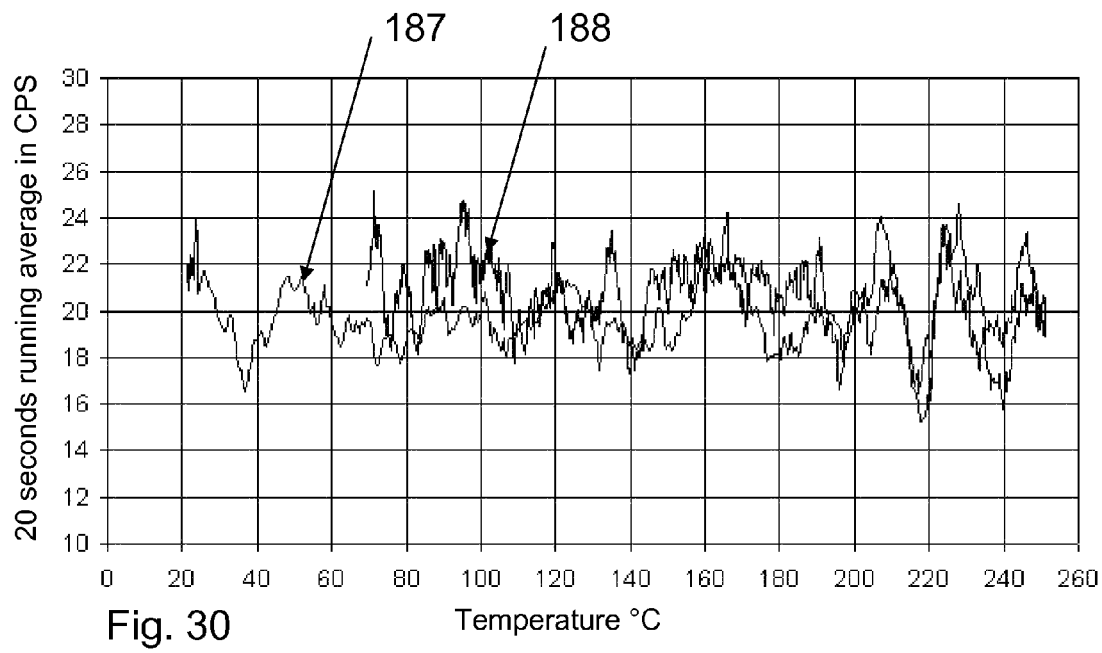

FIG. 30 illustrates the visual correlation between the portion of the series of the previous moving measurements traced according to the rise of the distant temperature and the portion of the series of the previous moving measurements traced according to the descent of the distant temperature.

Figure 31:
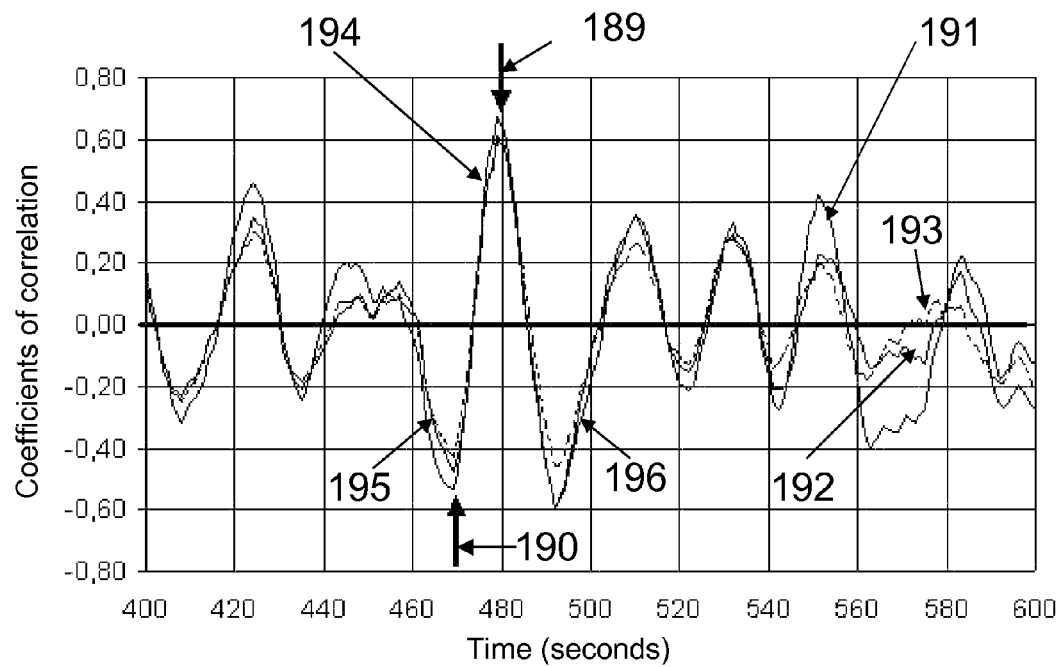

FIG. 31 illustrates the evolution of the coefficients of correlation versus time between measurements corresponding to the steps of rise and descent of the temperature of the characteristic profile applied to the moving average of FIG. 29, with one greatest maximum among the maximum characteristic at 480 seconds.

Figure 32:
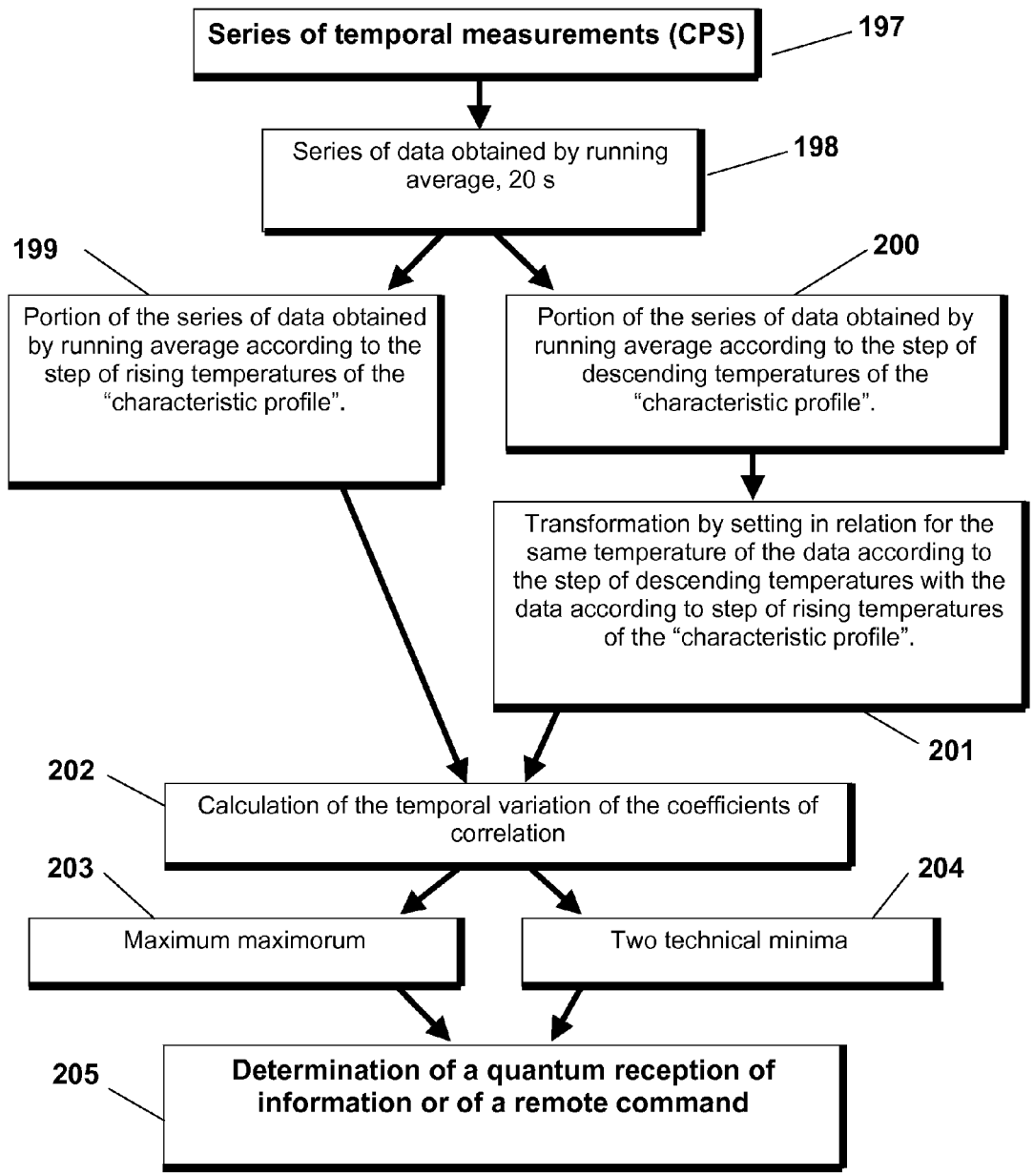

FIG. 32 shows the flow chart of the various operations of the process to determine, with the received temporal data, the distant quantum reception of information or command in the particular mode of the invention whose result is illustrated on FIG. 31.

MANNERS OF IMPLEMENTING THE INVENTION

Manners of implementing the invention are described below. However it is specified that the present invention can be implemented in various ways. Thus, the specific details mentioned below should not be understood as limiting the implementation, but rather as a descriptive base to support the claims and to teach to the man skilled in the art the use of this invention, in practically the totality of the detailed and appropriate systems, structures or manners.

The samples can be made up of thermoluminescent or photoluminescent materials whose wavelengths of luminous emission correspond to several types of traps emptying itself at different temperatures. Moreover, these traps can be emptied partially with each rise in temperature. Consequently, one group of samples irradiated together by entangled rays can be used to transmit a message or an order comprising several digits (binary encoding).

Figure 1:
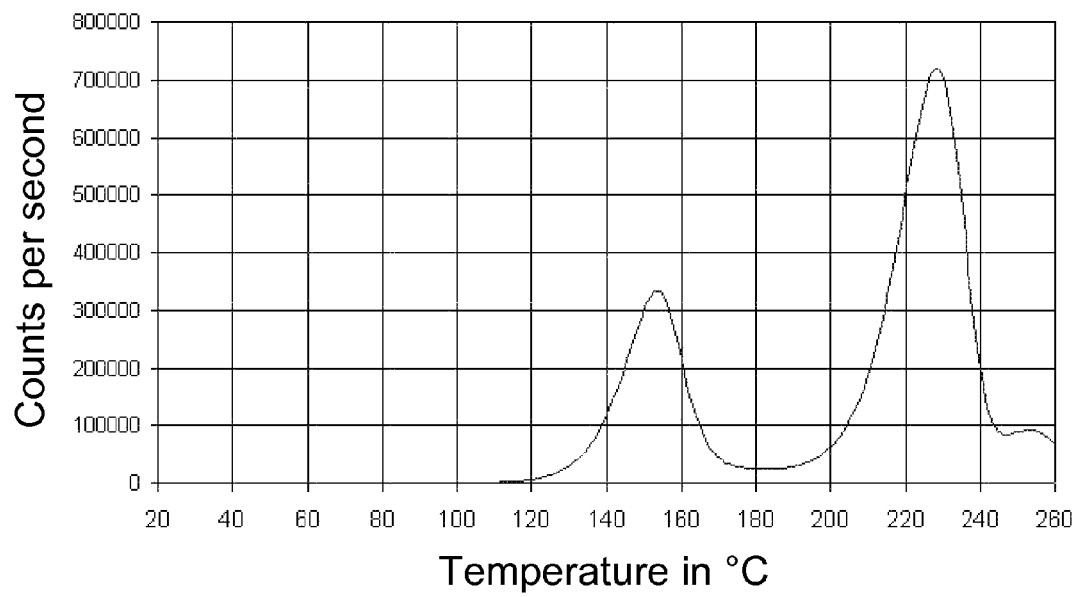
Figure 2:
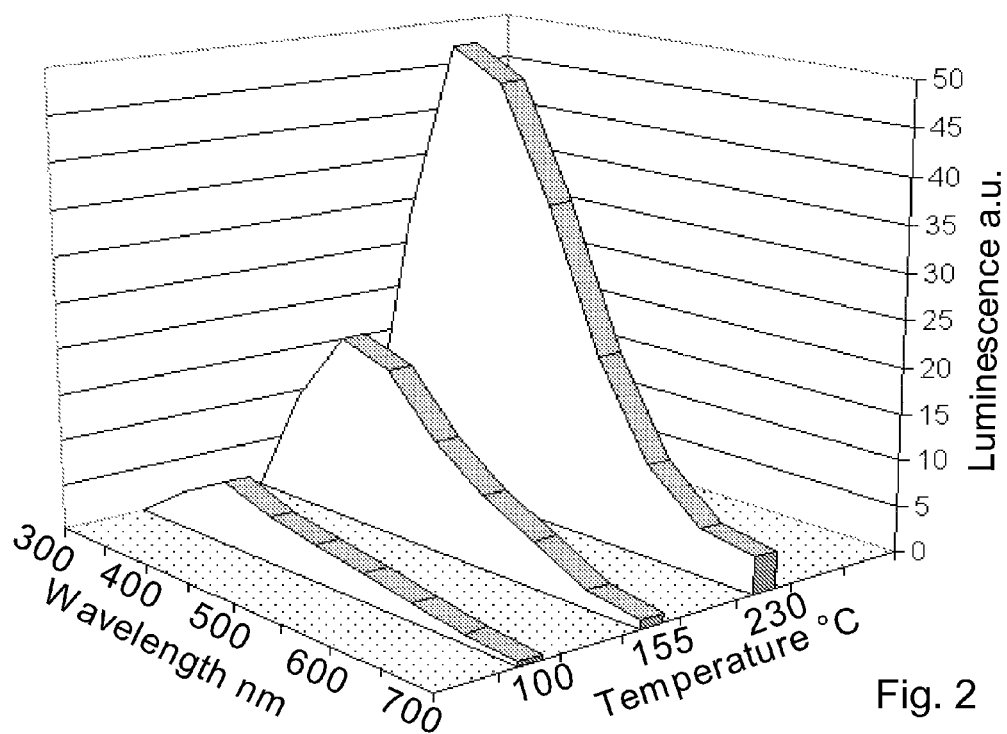
Figure 3:
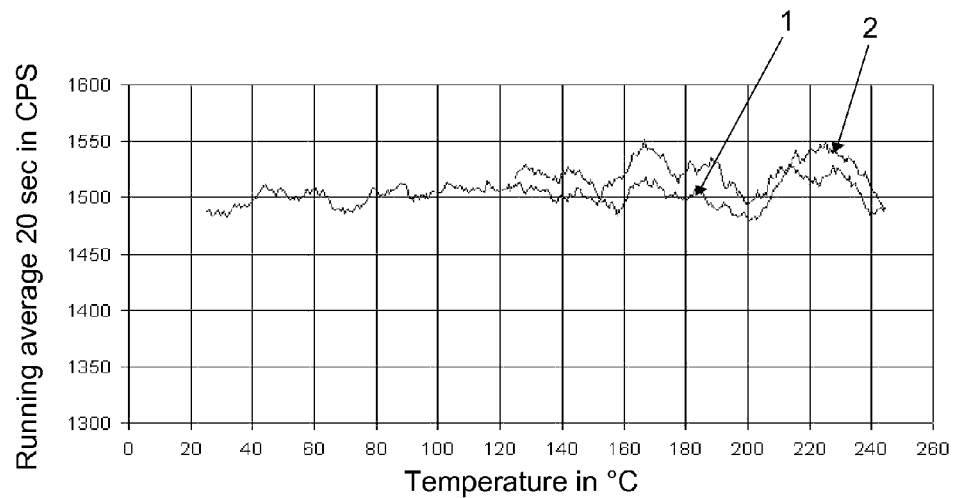
Figure 4:
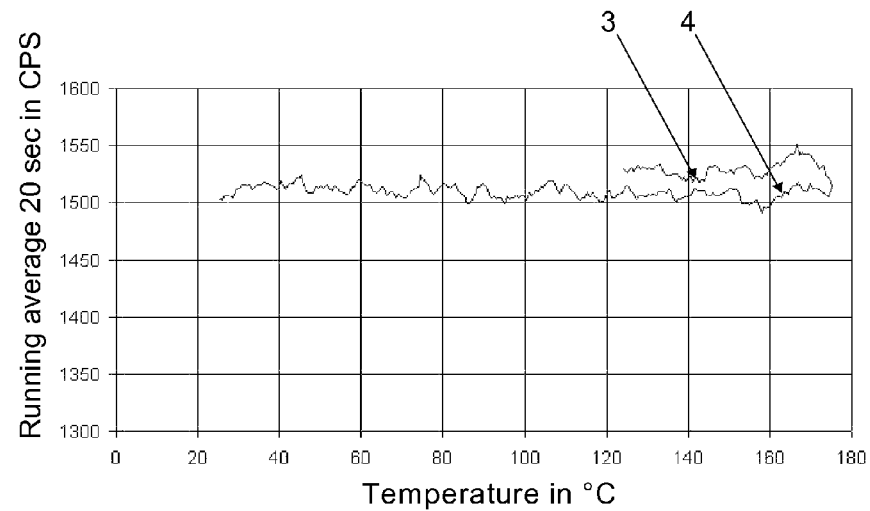
FIG. 4 represents the typical response of a test of rise and descent in temperature limited to 175° C.
Figure 5:
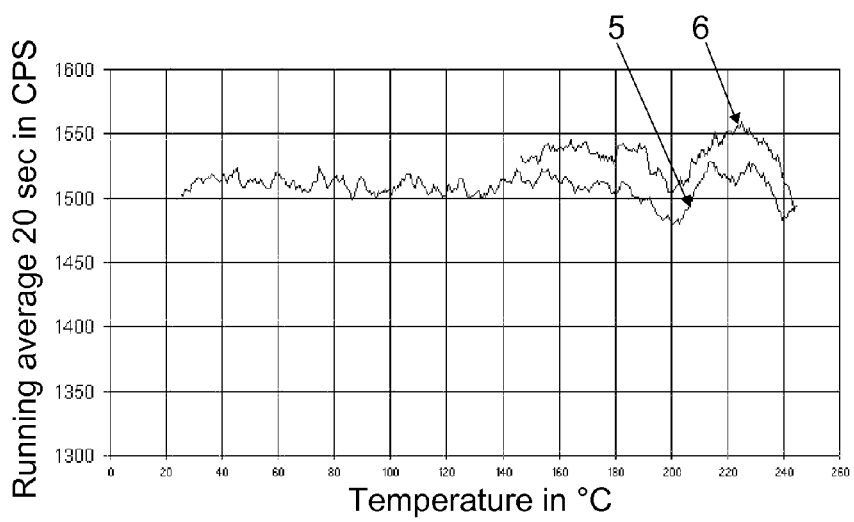
FIG. 5 represents the typical response of a test of rise and descent in temperature limited to 245° C. after emptying of the traps of the peak at 170° C.
Figure 6:
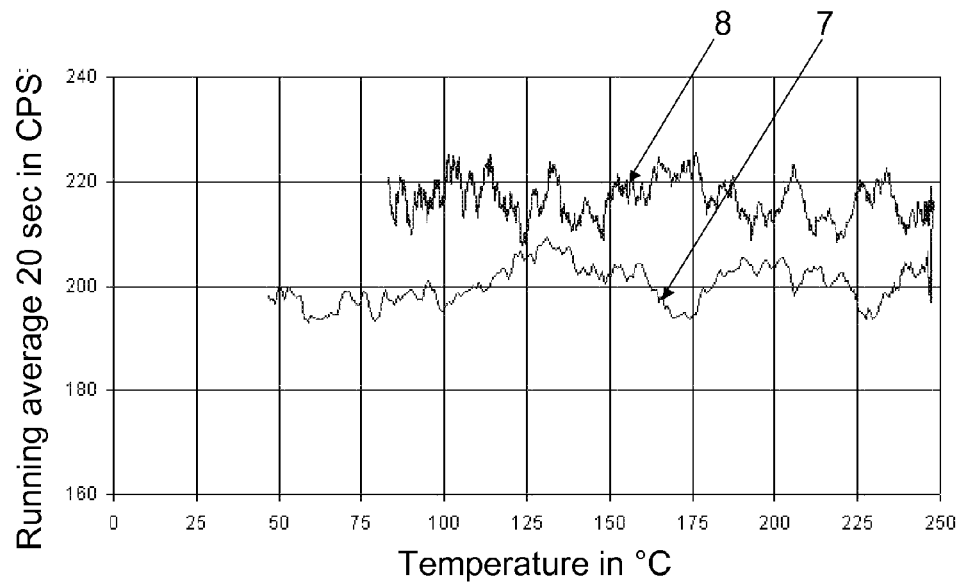
FIG. 6 represents the typical response of a test of rise and descent in temperature limited to 245° C. in which hollows occur in rising temperature and of the peaks in downward temperature.
Figure 7:
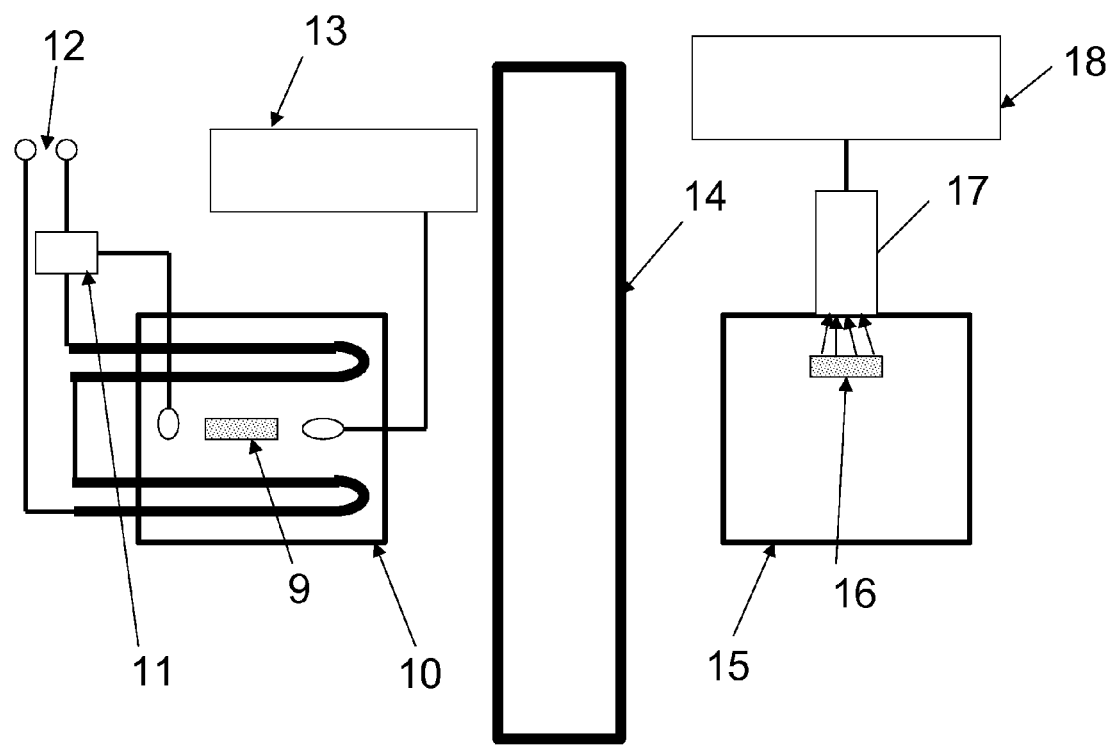
FIG. 7 represents an implementation of the invention to measure the response of a "slave" sample at the time of the rise in temperature of the "master" sample.
Figure 8:
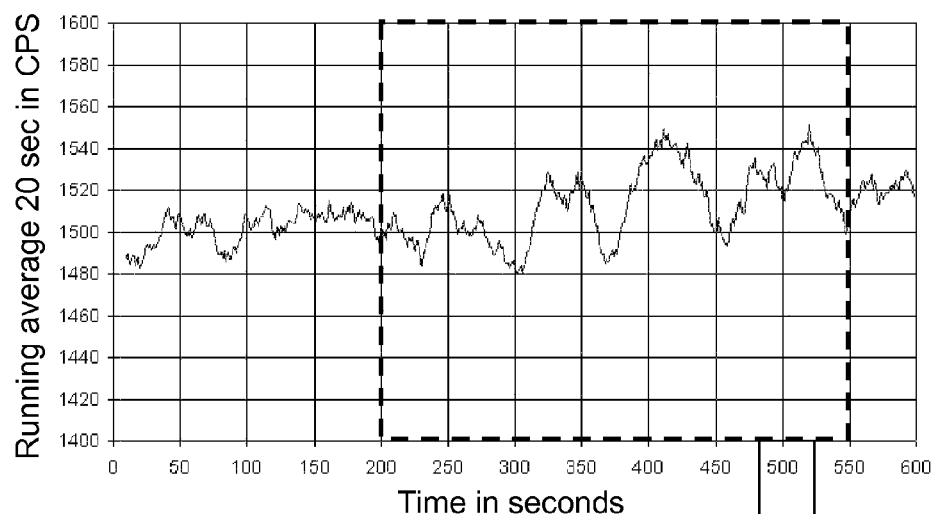
FIG. 8 represents a typical recording versus time of a test of rise and descent in temperature limited to 245° C. at 375 seconds.
Figure 9:
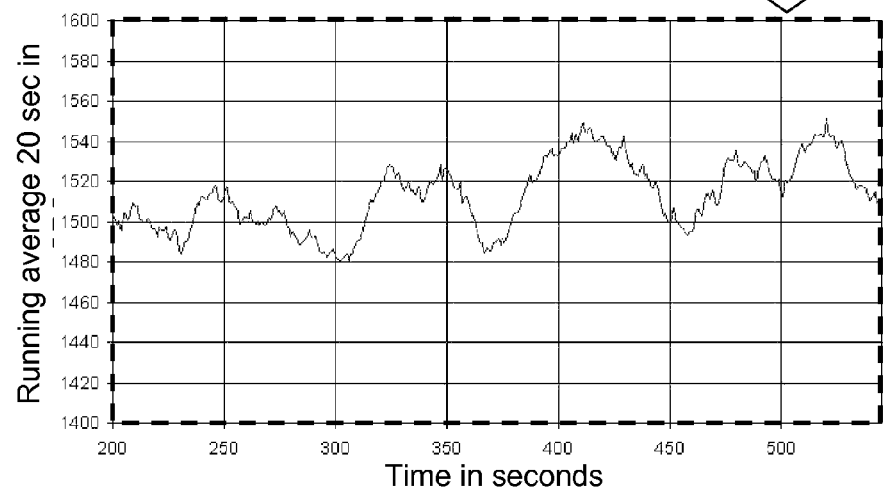
FIG. 9 represents the part of the curve of FIG. 9 selected to calculate the correlation coefficient between the rise and the descent in temperature.
Figure 10:
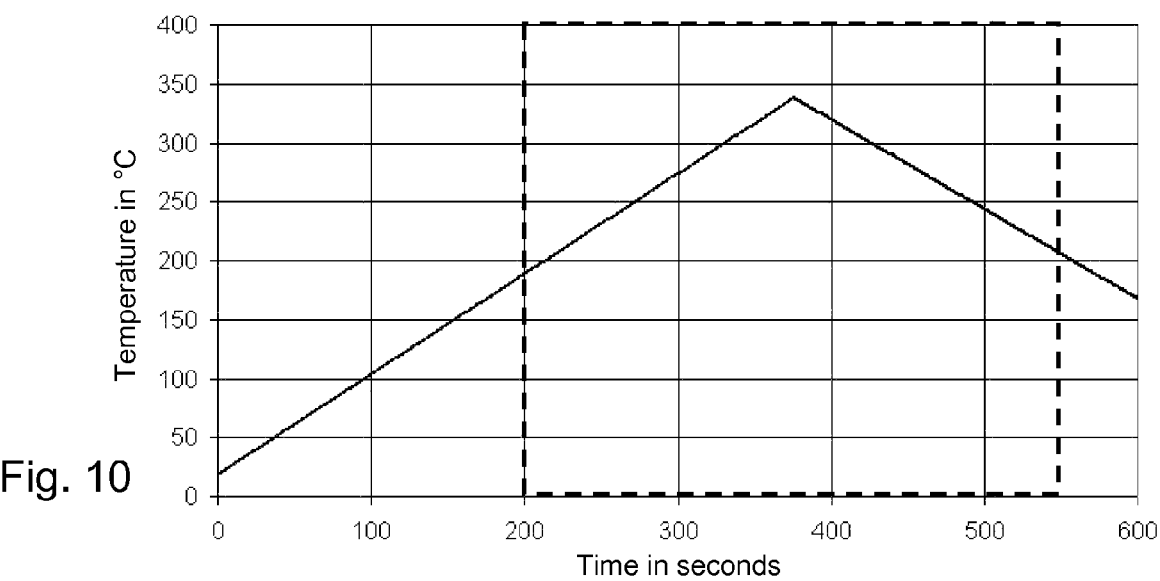
FIG. 10 represents the rise and the descent in temperature of the oven versus time.
Figure 11:
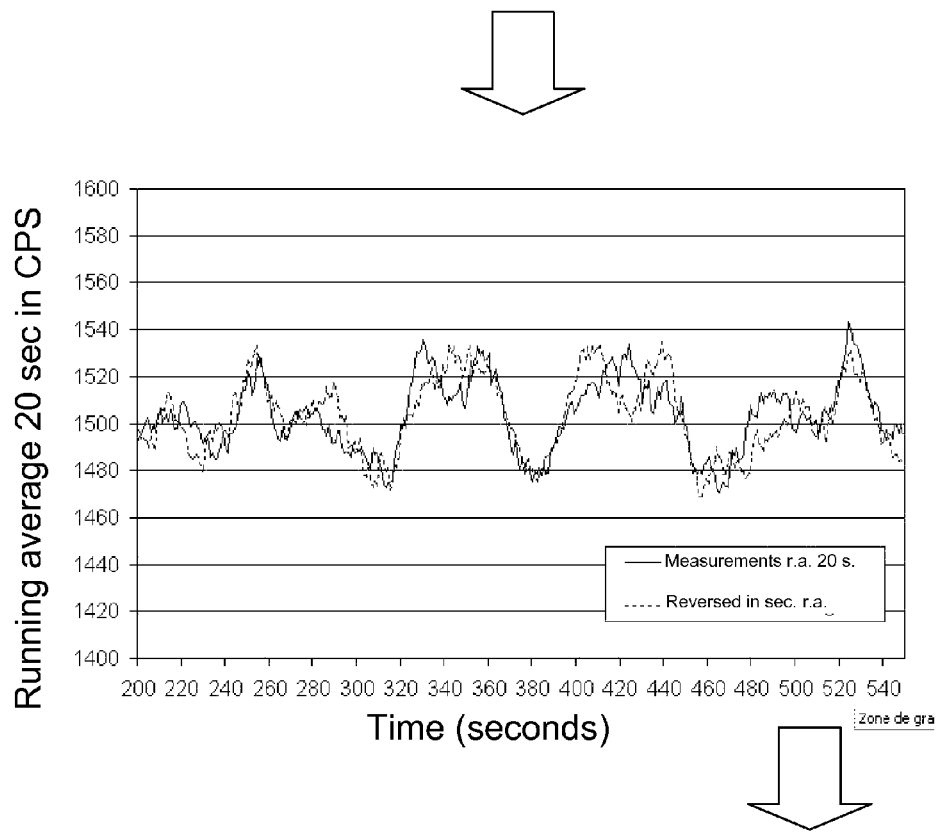
FIG. 11 represents the curve of FIG. 10 and the same curve reversed versus time by taking account of the curve of FIG. 11.
Figure 12:
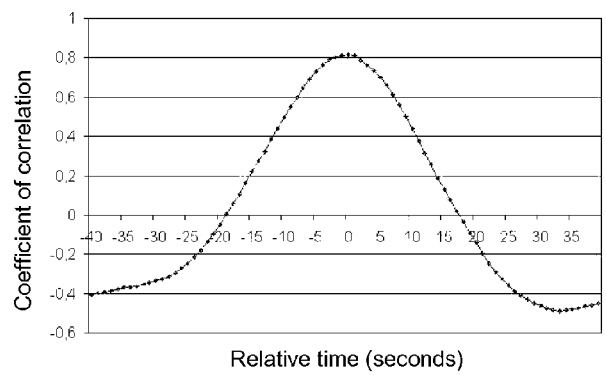
FIG. 12 represents the variation of the coefficient of correlation while sliding curves from FIG. 12 from plus 40 seconds to minus 40 seconds by comparing one to the other.
Figure 13:
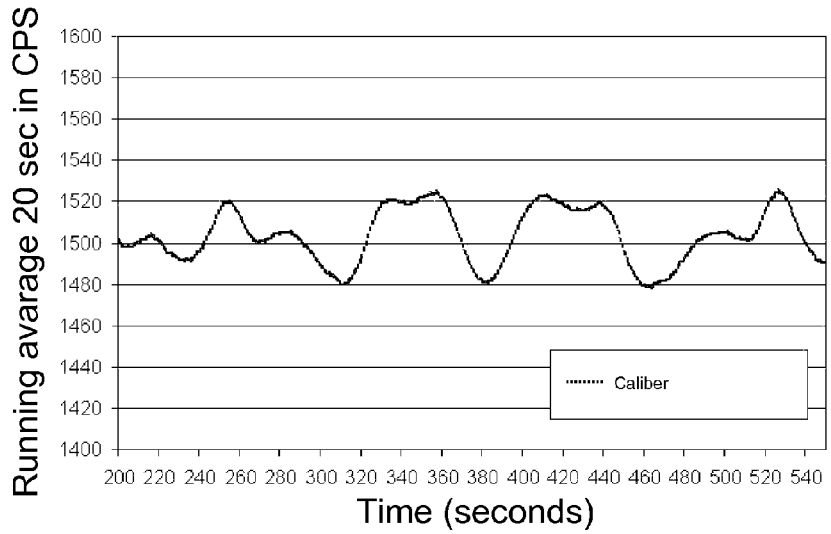
FIG. 13 represents a heuristic template, which can be used to carry out the correlation.
Figure 14:
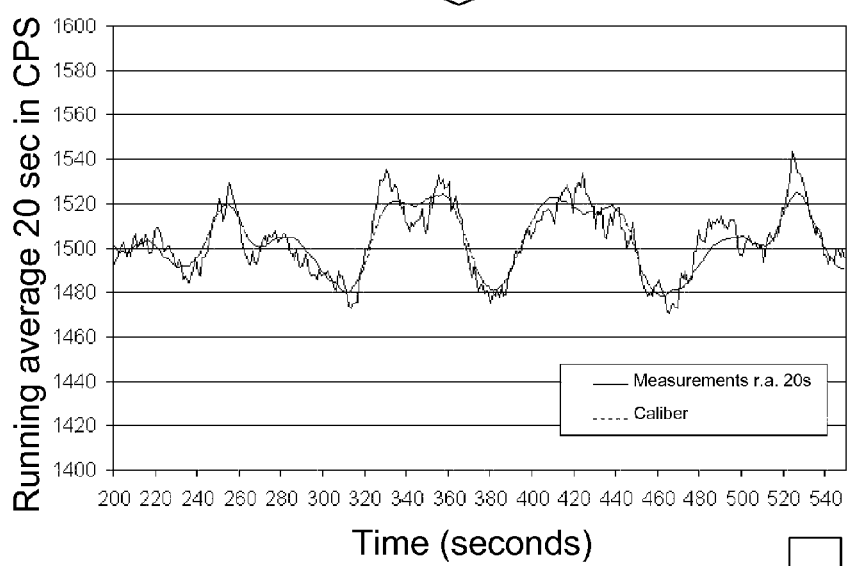
FIG. 14 represents the curve of FIG. 10 on which the template was superimposed.
Figure 15:
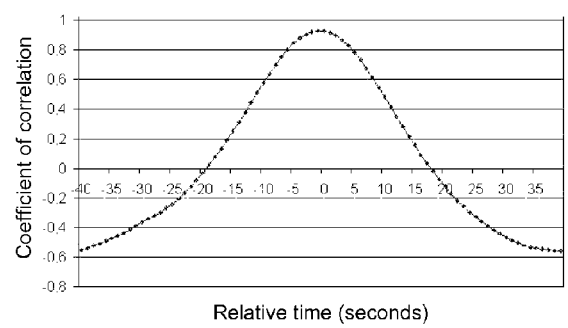
FIG. 15 represents the variation of the coefficient of correlation while sliding curves from FIG. 15 from plus 40 seconds to minus 40 seconds by comparing one to the other.

The simplest implementation of the invention can be done like illustrated on FIG. 8 described previously. In order to improve quality of the recordings and in particular the signal to noise ratio, various additions are presented.

Figure 16:
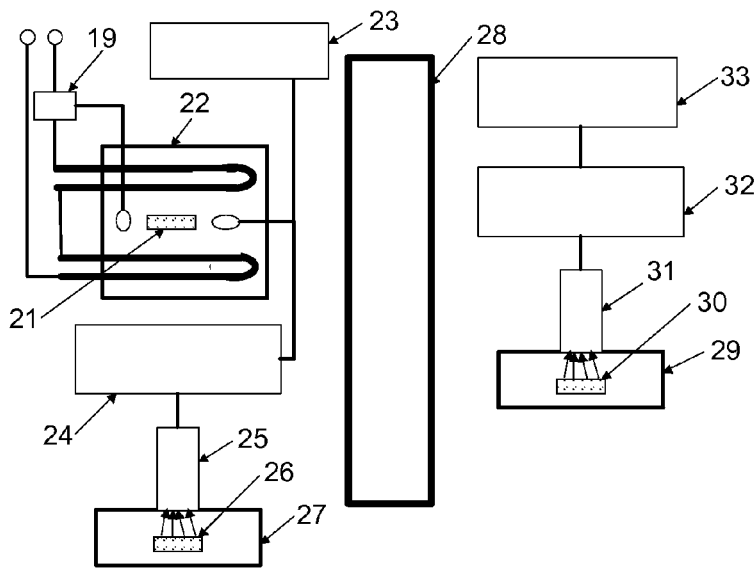
FIG. 16 represents an implementation of the invention to measure the response of the "slave" sample at the time of the rise in temperature of "master" sample. A second "slave" sample is to be used to optimize the rise in temperature.

On FIG. 16, two samples irradiated together are used in order to optimize the variation of the temperature. The oven (22), which contains the "master" sample (21), is powered in energy. A thermostat (19) monitors the temperature of the oven. The digital thermometer (23) receives the data of temperature determined by the circuit (24) and coming, for example, from the photomultiplier (25) illuminated by the auxiliary "slave" sample (26) placed in the obscure room (27). The circuit of the thermometer (23) controls the thermostat (19) to implement the optimal profile of temperature. The receiving system is placed at any distance, in any medium, schematized by the partition (28). The useful "slave" sample (30) is placed in the obscure room (29). The photomultiplier (31), for example, measures the luminescence of the sample (30). These measures are transmitted to the circuit (32) to be recorded by the computer (33).

Figure 17:
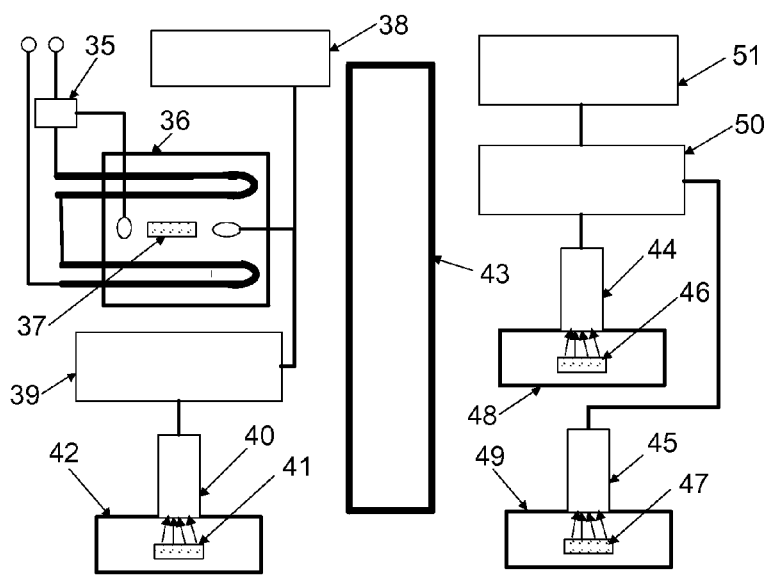
FIG. 17 represents an implementation of the invention to measure the response of two "slave" samples at the time of the rise in temperature of the "master" sample, in order to have a better signal to noise ratio. A second auxiliary "slave" sample is used to optimize the rise in temperature.

In the implementation of FIG. 17, three samples irradiated together are used in order to optimize the variation of the temperature and to decrease the signal to noise ratio. The oven (36), which contains the "master" sample (37), is powered in energy in (34). A thermostat (35) monitors the temperature of the oven. The digital thermometer (38) receives the data of temperature determined by the circuit (39) and coming, for example, from the photomultiplier (40) illuminated by the auxiliary "slave" sample (41) placed in the obscure room (42). The circuit of the thermometer (39) controls the thermostat (35) to implement the optimal profile of temperature. The receiving system is placed at any distance, in any medium, schematized by the partition (43). The principal "slave" sample (46) is placed in the obscure room (48). The photomultiplier (44), for example, measures the luminescence of the principal "slave" sample (46). These measures are transmitted to the circuit (50) to be recorded by the computer (51). A secondary "slave" sample (47) is placed in the obscure room (49) near the obscure room (48). The photomultiplier (45), for example, measures the luminescence of the secondary "slave" sample (47). The signal of luminescence is sent to the circuit (50) to be processed with the signal coming from the principal "slave" sample (46) in order to decrease the signal to noise ratio.

Figure 18:
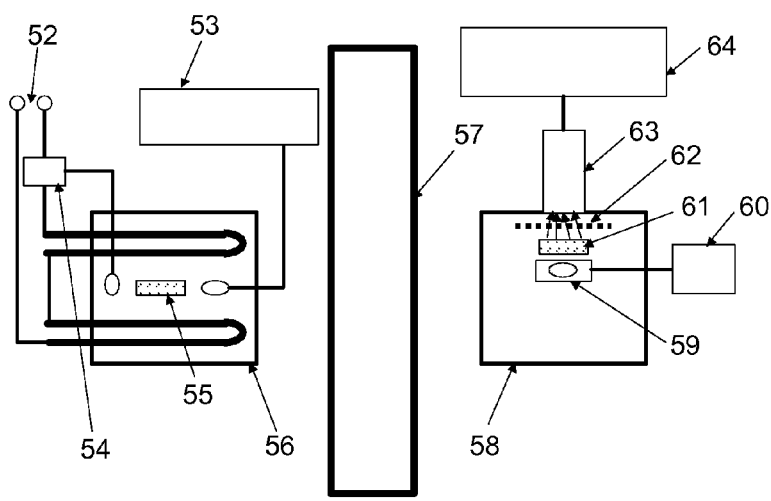
FIG. 18 represents an implementation of the invention to measure the response of the "slave" sample at the time of the rise in temperature of "master" sample, the "slave" sample being maintained at an optimal temperature.

FIG. 18 represents an option, which can be applied to the principal "slave" sample (61), in order to improve the signal of luminescence. On the left part of the Figure, the "master" sample (55) is placed in the oven (56). The temperature of the oven is measured by a digital thermometer (53). The maximum temperature of cut-off is controlled by the thermostat (54), which is not re-engaged during the descent in temperature. The oven is powered in energy in (52). The receiving system is placed at any distance, in any medium, schematized by the partition (57) and at any distance. The obscure room (58) contains the "slave" sample (61), which is placed opposite the photomultiplier (63). The temperature of the "slave" sample (61) is controlled by, for example, a resistance (59) and a power supply (60). A transparent screen (62) protects the photomultiplier (63). The circuit (63) ensures the counting and the recording of the impulses due to the luminescence of the "slave" sample (61).

On the left part of FIG. 19, the quantum transmitter contains in the oven (65) a generator of radiation (66), for example a laser or an infrared lamp. The radiation is filtered by the optical filter (67) to obtain a single wavelength, in particular if the emptying of the traps is done by photo-stimulation, in order to deexcite the "master" sample (68). An electronic circuit (69) controls the generator (66) and filters (67) using information coming from a detector of luminescence (70), for example a photomultiplier, which is illuminated by an auxiliary "slave" sample (72) placed in the obscure room (71), in order to optimize the transmission. The quantum receiver, on the right part of the Figure, is placed at any distance, in any medium, schematized by the partition (73). The "slave" sample (76) is placed in the obscure room (75). A detector of luminescence (77) sends its signal towards the electronic circuit (78). The signal is then compared with the template signal stored in the memory (74). The coefficient of correlation is recorded in the computer (79), which validates or rejects the signal.

On the left part of FIG. 20, the quantum transmitter contains in an oven (80) a generator of radiation (81), for example a laser or an infrared lamp. The radiation is filtered by the optical filter (82) to obtain a single wavelength, in particular if the emptying of the traps is done by photo-stimulation, in order to deexcite the "master" sample (83). An electronic circuit (84) controls the generator (81) and filters (82) using information coming from a detector of luminescence (85), for example a photomultiplier, which is illuminated by the auxiliary "slave" sample (87) placed in the obscure room (86), in order to optimize the transmission. The quantum receiver, on the right part of the Figure, is placed at any distance, in any medium, schematized by the partition (88). The primary "slave" sample (93) is placed in the obscure room (92). A detector of luminescence (94) sends its signal towards the electronic circuit (95). The signal is then compared with the signal of a secondary "slave" sample (89) placed in the obscure room (90). The illumination is measured by the detector of luminescence (91). The signal of illumination is sent towards the electronic circuit (95), which computes a correlation. The coefficient of correlation is recorded in the computer (96), which validates or rejects the signal. The electronic circuit (95) may also compute an average of the signals and compare it with a template as in FIG. 20.

In the left part of FIG. 21, the luminescence of the "master" sample (103), placed in the oven (104), is measured by the detector (101). Said detector is protected from heat by the transparent screen (102). The oven is powered in energy in (97). The temperature of the oven is measured by the electronic thermometer (98). The rise in temperature is optimized by the computer (100), which controls the thermostat (99) using the signals of luminescence and temperature. The quantum receiver, on the right part of the Figure, is placed at any distance, in any medium, schematized by the partition (105). On this Figure it is similar to that of FIG. 19. The obscure room (106) contains the "slave" sample (109), which is placed opposite the photomultiplier (111). The temperature of the "slave" sample (109) is controlled, for example, by a resistance (107) and a power supply (108). A transparent screen (110) protects the photomultiplier (111). The circuit (112) ensures the counting and the recording of the impulses due to the luminescence of the "slave" sample (109).

Any system of measurement on the "slave" sample can be associated with any system with stimulation of the "master" sample without leaving the framework invention.

According to a mode of implementation of the invention, an apparatus of irradiation is schematized on FIG. 22. The groups of samples (216) are placed on a revolving tray (215). This tray is supported by an axis (218) and is connected to one stepper motor (210), itself commanded by a timer (219). The groups of samples are presented one after the other in front of the beam of gamma rays of a compact linear accelerator (213) for example. An absorber (217) stops the not absorbed gamma rays. In general the accelerators cannot function permanently. A certain number of units of time of irradiation, for example of 1 minute, is applied to each sample to obtain the optimal excitation using a timer (214). In the case of doped Lithium fluoride samples, a 2 minutes excitation with a compact linear accelerator is enough to obtain a dose of 2 Gray. These samples are then maintained in the darkness in order not to increase "fading".

FIG. 23 illustrates a mode of irradiation of the samples placed on two trays.

The samples (114) and (118) are irradiated simultaneously at the same distance from accelerator (193). This accelerator is controlled by a timer (192) synchronized with the position of the samples. An absorber (119) stops the gamma rays not absorbed by the samples. The samples are placed on two trays (191) and (115), which are supported by axes (116) and (120). Two stepper motors (117) and (121) ensure the synchronous rotation of the trays. A timer (122) synchronized with the timer (192) of the accelerator controls the operation of the stepper motors. The aforementioned samples can be also built-in in the discs in a discrete or continuous way. The same result can be obtained with the use of tapes or bands to carry the samples or to incorporate them in a discrete or continuous way.

FIG. 24 illustrates a particular mode of use of beams of entangled X-rays or entangled gamma to entangle thermoluminescent samples placed on only one support (191). One finds elements, which are described above for FIG. 23. In this preparation, after having carried out the successive irradiations of the samples, one carries out a subdivision (128): one obtains then two discs (130) and (131). Certain samples are entangled two to two, for example (132) and (133), which are resulting from the division of sample (118).

FIG. 25 illustrates the preparation of the samples used in the mode "multiple mono-master/single multi-slave" of the invention. A generator (143) produces, by Bremsstrahlung effects, a beam of entangled photons X or gamma. This entangled beam irradiates successively the thermoluminescent samples (148) of the tray (147), and also the stationary thermoluminescent sample (149). An absorber (151) stops the photons, which did not interact with the samples. The samples, which are placed on the tray (147), constitute the future "mono-master" samples (148), and the single sample placed on the support (153) constitutes the future "multi-slave" sample (149), of which the later measurement could be repeated a great number of times during the later quantum transmissions. A stepper motor (150) commands the rotation of the tray (147). A timer (154) powered in energy in (155) commands the stepper motor and the electronic circuit (146), itself powered in energy in (145). This circuit commands operation of the generator set (143), which generates entangled gamma or X rays (144).

FIG. 26 shows the exploitation of samples of the trays irradiated in FIG. 24. On the left part of the Figure, the "main" tray (159) is placed in the enclosure (157). The sample (160), for example, is stimulated by heating (thermo-deexcitation) or photo deexcitation using the generator (158). This generator is commanded by the electronic circuit (156). The tray is supported by the axis (161) attached to the stepper motor (162). A timer in the electronic circuit (156) commands the generator (158) and the stepper motor (162) for the synchronization of the process. The quantum receiver, on the right part of the Figure, is placed at any distance, in any medium, schematized by the partition (163). The "slave" tray (167) is placed in the obscure enclosure (166); it is supported by the axis (169) attached to the stepper motor (170). A detector of luminescence (165) carries out a series of measurements of luminescence on the sample (168). The measurements are recorded by the computer (164), which applies one of the modes of the process of the invention more particularly applicable to a series of measures on one "slave" sample in order to determine a quantum reception of information. A timer in the computer (164) commands the stepper motor (170) for the synchronization of the process.

FIG. 27 is an illustration of the "multiple masters" mode of the invention. It illustrates a particular use of the disc fabricated as indicated in FIG. 25 with one "single" "slave" sample especially prepared instead of another tray. In order to possibly optimize its properties of response to the stimulations applied to the samples of the "master" tray, the "single" "slave" sample can, for example, be of a larger surface. On FIG. 27 the quantum transmitter functions as the quantum transmitter of FIG. 26. The quantum receiver, on the right part of FIG. 27, is placed at any distance, in any medium, represented diagrammatically by the partition (178). The "single" "slave" sample (180) is placed in the obscure enclosure (179); it is placed on a support (181). A detector of luminescence (182) carries out a series of luminescence measurements on the "single" "slave" sample (180). Measurements are recorded in the computer (183), which applies a search for correlation according to one of the modes of the process of the invention more particularly applicable to a series of measurements to only one "slave" sample, in order to determine a quantum reception of information. The quantum receiver can operate continuously on the "single" "slave" sample, whereas the quantum transmitter, represented diagrammatically on the left part of FIG. 27, stimulates by thermo-deexcitation or photo deexcitation, by means of the generator of calorific or optical energy (172), one or more time, one of the "master" samples of the tray (174), successively according to the optimization of the process. The tray is placed in the enclosure (173), it is supported by the axis (176) connected to the stepper motor (177). A timer (171) commands the generator (172) and the stepper motor (177) for the synchronization of the process.

BEST MANNER OF IMPLEMENTING THE INVENTION

In a particular mode of preferred implementation, two doped Lithium fluoride thermoluminescent samples, are irradiated together by X-rays coming from a Tungsten target, by Bremsstrahlung effect, for a sufficient length of time to trap entangled electrons in these samples, for example during 10 seconds. These samples are separated and are transported a long distance, for example of 8500 km. Thus, in the implementation presented, one of them, the "slave" sample, remains in Givarlais in France, and the other, the "master" sample, is transported to Stillwater, Okla., in the United States.

The quantum process of emission by means of a stimulation by heating is applied to the "master" sample: the characteristic profile of temperature comprises a step of rise from 20° C. to 251° C., and a step of descent in temperature from 251° C. to 70° C.

The quantum process of reception includes the implementation of a series of temporal measurements of luminescence of the "slave" sample, which is maintained at a constant temperature of 20° C. and the interpretation of these measurements.

FIG. 32 details the successive treatments of the process making it possible to determine the reception of information or a distant command resulting from the quantum transmission. First of all, the series of temporal measurements (197), expressed in counts per seconds (CPS), is recorded by the detector of photons, for example the photomultipliers (31, 44, 45, 63, 77, 91, 94 or 111). These measurements are illustrated on FIG. 28 by the curve (184).

In order to decrease the noise level of the detector of photons, the process of moving average of FIG. 32 is applied to the previous measures (198), for example with 20 seconds. FIG. 29 represents this moving average (185) and for information the instant of reversal (186) corresponding to the maximum of temperature of the distant "master" sample, this instant not being known quantum receiver and being one of the objects of the process of the determination of the transmission of information or of a distant command.

FIG. 30 represents according to the temperature of the "master" sample distant of 8500 km, the curve (187), recorded on the "slave" sample, located in France, during the stimulation by heating of the "master" sample, located in the United States, from 20° C. to 251° C. The thick curve (188) is also recorded on the "slave" sample, located in France, at the time of the descent in temperature from 251° C. to 70° C. of the "master" sample, located at the United States. These curves are calculated using the curve (185) of FIG. 29 and the instant of reversal (186). These curves are given as an indication to visualize the correlation in spite of the noise of the photomultiplier used. They can be traced only after the determination of the point of reversal.

In the process of FIG. 32, the correlation is evaluated with each new measurement available, on a portion of the series of moving averages corresponding to the duration of the characteristic profile of temperature and of the delay induced by the moving average. Each value of correlation is evaluated as if the quantum transmitter were finishing a stimulation according to the characteristic profile.

A portion of the series of data obtained by the moving (199) corresponding to the step of rising temperatures of the characteristic profile is set in relation, for the same temperatures of the characteristic profile, with the transformation (201) of the portion of the series of data (200) obtained with a moving average of the step of decreasing temperatures of the characteristic profile.

The calculation of the coefficients of correlation (202) is carried out for various ranges of temperature (which correspond to characteristic profiles different lengths), with the two portions of the series of data (199) and (200) as the values of consecutive temporal data become available.

FIG. 31 represents the variation of the coefficients of correlation versus time in the base of time of the quantum transmitter, each value of correlation can be calculated in real time only after the duration of the corresponding characteristic profile. Three curves are calculated: the curve (191) gives the coefficient of correlation on a range of rising and descending temperature between 200° C. and 251° C. (short characteristic profile), the curve (192) gives the coefficient of correlation on a range of rising and descending temperature between 175° C. and 251° C. (medium characteristic profile), the curve (193) gives the coefficient of correlation on a range of rising and descending temperature between 150° C. and 251° C. (long characteristic profile).

In the process of FIG. 32, the interpretation of the variation of a coefficient of correlation versus time is carried out in (203) by the research of a greatest maximum among the maximum ("maximum maximorum") and of two technical minima (204) in order to carry out the determination of the reception a quantum of information or a distant command (205). On FIG. 31, one notes the greatest maximum among the maximum (194) of the curves at 480 seconds, which corresponds to time when the distant "master" sample (for example 103, FIG. 21) has reached its maximum temperature of 251° C. The cut off of the power supply of the oven (for example 104, FIG. 21 is produced 10 seconds before the maximum of correlation, that is to say at 470 seconds in (190) on FIG. 31. The coefficients of correlation are calculated either deferred as of availability of the values makes it possible to calculate the correlation on the basis of the longest characteristic profile, or progressively as the values become available, the coefficient of correlation associated with a short characteristic profile being in relation to the distant stimulation in phase lead. In this case, the three coefficients of correlation nevertheless are exploited in the same base of time relating the moment of reversal of the temperature of the characteristic profiles to allow the comparison of the correlations as represented on FIG. 31. The presence of 3 greatest maximum among the maximum (194) is characteristic of the detection of distant stimulation. It is also noted that two technical anti-correlations (195) and (196) occur quasi-symmetrically with respect to the peak of correlation (194). These technical anti-correlations can vary according to the optimization of the processes of quantum transmission implemented. The greatest maximum among the maxima (194) allows to determine the moment when the maximum temperature of the "master" sample, for example (21, 37, 55, 68, 76, 83 or 103) is reached. The process is used for purposes of implementing the determination of a distant quantum reception of information or command. According to the optimization of the quantum process of transmission, the same samples can be used to carry out one or more successive quantum transmissions at different instants. According to the optimization of the quantum process of transmission, several "master" samples entangled with same "slave" sample can be used. The man skilled in the art will also be able to apply the process to the complex products defined in [7].

The man skilled in the art can obviously extend this teaching to other alternatives of implementation without leaving the framework of this invention. In particular the frequencies of determinations of information or distant command can be increased according to the optimization of the quantum process of transmission and some fitted characteristic profiles can be defined without leaving the framework of this invention.

POSSIBILITIES OF INDUSTRIAL APPLICATIONS

Various industrial applications are immediately possible, emergency signals in the mines, sea-beds, at interplanetary distances, etc. The process, object of the invention, also makes it possible to carry out quantum transmissions under environmental conditions in which the electromagnetic transmissions are difficult, even impossible. Moreover, these quantum transmissions can be neither detected, nor disturbed by anyone. They are rigorously secret. However additional "slave" samples can be given to trusted third party to carry out recordings according to the applicable legislations.

Devices according to the invention, including commercial kits of demonstration of the process, can be implemented.

The process according to any of the modes of the invention can be used, either to transmit information or commands, or to receive information or commands, or to transmit and receive information or commands.

Generally, the devices of implementation of the process according to any of the modes of the invention are characterized in that they include at least one of the following equipment, insofar as it is intended to apply the part of the process, object of the principal process or of one of modes of the principal process, located on the place covered by this patent, including the aircraft, marine, underwater and space vessels, and terrestrial, marine and space probes:

One or several "quantum transmitters" equipment
One or several "quantum receivers" equipment

REFERENCES

[1] Weber M. J. and Tompson B. J. <<Selected Papers on Photoluminescence of Inorganic Solids>>, SPIE Milestone Series, V. Ms 150, August 1998.
[2] Justus B. L. et al., <<Dosimetry measurements>>, CRC Press LLC, (2000).
[3] Shani G., <<Radiation Dosimetry: Instrumentation and Methods>>, CRC Press (January 2001).
[4] Botter-Jensen L., McKeever S; W; S., and Wintle A; G., <<Optically Stimulated Luminescence Dosimetry>>, Elsevier, Amsterdam, NL, (2003).
[5] McKeever S. W. S., <<Thermoluminescence of solids>>, Cambridge University Press, 1985.
[6] Furetta C., <<Handbook of Thermoluminescence>>, World Scientific Publishing.
[7] Desbrandes, R., and Van Gent D. L. <<Method and device for remotely communicating by using photoluminescence or thermoluminescence>>, International filing at WIPO N° WO 2005/117306, on May 23, 2005.
[8] Desbrandes, R., <<Procádé pour générer des faisceaux intriqués d'électrons, de rayons infrarouges, visibles, ultraviolets, X et gamma>>, demande de brevet français N° 06/00967 du 31 janvier 2006.
[9] Einstein A., Podolsky B., Rosen N., <<Can Quantum-Mechanical Description of Physical Reality Be Considered Complete?>>, Phys. Rev. 47, 777, (1935)
[10] Bell J. S., <<Speakable and Unspeakable in Quantum Mechanics>>, New York, Cambridge University Press, 1993.
[11] Aspect A., <<Trois tests expérimentaux des inégalités de Bell par mesure de corrélation de polarisation de photons>>, Doctoral Dissertation, Université Paris-Orsay, 1$^{er}$ Février 1983.
[12] Townsend P. D., Rarity J. G., Tapster P. R., <<Single-Photon Interference in 10 km Long Optical-Fiber>>, Electronics Letters, V 29, p. 634, 1993.
[13] Duncan A. J., and Kleinpoppen H., <<Quantum Mechanics versus Local Realism>>, (F. Selleri, ed.), Plenum, New York, 1988.
[14] Greenberger D., et al,. <<Bell's Theorem Without Inequalities>>, Amer. J. of Phys., 58, (12), December 1990.
[15] Whitley V. H. et McKeever S. W. S., Linearly modulated photoconductivity and linearly modulated optically stimulated luminescence measurements on $Al_2O_3$: C, J. of Appl. Phys. 90, 6073-6083, 2001

The invention claimed is:

1. Process to remotely communicate by using the interpretation of signals of thermoluminescence or photoluminescence in which one uses amongst other things:
    a) at least one group of samples comprising at least one kind of material having properties of thermoluminescence and/or photoluminescence, which present connections, called by convention "quantum" couplings, between entangled trapped electrons of the aforesaid materials, the aforementioned group of samples being called per convention the group of "entangled" samples,
    b) at least stimulation by thermo-deexcitation or photo deexcitation, characterized in that:
    c) at least one "quantum transmitter" equipment, comprising at least one "entangled" sample of the aforesaid group, called the "master" "entangled" sample, carries out a transmission of information, called "quantum transmission", by means of a stimulation, either in a thermo-deexcitation mode, or in a photo-deexcitation mode, or by a combination of both modes, on whole or part of said "master" "entangled" sample, during an interval of time, by applying, one or successively several heuristic profiles of variation of at least one parameter of stimulation applied versus time, called by convention "characteristic profiles", in order to transitorily modify the probability of deexcitation of some of said entangled trapped electrons, by means of said stimulation applied according to one or several of the aforesaid "characteristic profiles",
    d) at least one "quantum receiver" equipment, comprising at least another "entangled" sample of the aforesaid group, called the "slave" "entangled" sample, carries out versus time at least one series of measurements of luminescence in at least one optical wavelength or at least one bandwidth of optical wavelengths, on the aforesaid "slave" "entangled" sample or on the "slave" aforesaid "entangled" samples, one or more of the aforesaid series of measurements being interpreted by at least one method of calculation of a coefficient of correlation using said one or more series of measurements, or their transforms, in relation to at least one property of one or several of said "characteristic profiles" used by said "quantum transmitter", to determine the reception of at least one information, coded by the aforesaid "characteristic profile" or by the aforesaid "characteristic profiles", the aforesaid reception being called "quantum reception".

2. Method according to claim 1 in which at least one "characteristic profile" uses a variation of an aforesaid parameter of stimulation in order to exploit at least one peak of luminescence characteristic of at least one said kind of material having properties of thermoluminescence.

3. Method according to claim 1 in which at least one said "characteristic profile" uses at least an aforesaid parameter of stimulation, either of temperature, or of light intensity, or of incident wavelength, or of stimulated surface, or of stimulated volume, in order to transitorily modify the probability of deexcitation of some of said entangled trapped electrons according to one or several of the aforesaid parameters of stimulation.

4. Method according to claim 1 in which at least one said "characteristic profile" uses at least one variation of the temperature versus time comprising one or more steps, either of increase in temperature, or of decrease in temperature, or of maintenance of the temperature, or a combination of whole or part of these steps, in order to transitorily modify the probability of deexcitation of some of said entangled trapped electrons for said temperatures applied.

5. Method according to claim 4 in which the aforementioned kind of material is having properties of thermoluminescence, and the aforementioned stimulation is in a thermo-deexcitation mode.

6. Method according to claim 1 in which at least one "characteristic profile" uses at least one variation of the light intensity versus time comprising one or more steps, either of increase of the aforesaid light intensity, or of decrease of the aforesaid light intensity, or of maintenance of the aforementioned light intensity, or a combination of whole or part of these steps, in order to transitorily modify the probability of deexcitation of some of said entangled trapped electrons during said variation of light intensity applied.

7. Method according to claim 1 characterized in that at least one said "characteristic profile" uses at least one variation of the incident wavelength versus time, comprising one or more steps, either of increase of the aforesaid wavelength, or of decrease of the aforesaid wavelength, or of maintenance of the aforesaid wavelength, or a combination of whole or part of these steps, in order to transitorily modify the probability of deexcitation of some of said entangled trapped electrons during said variation of incident wavelength applied.

8. Method according to claim 1 characterized in that at least one said "characteristic profile" uses at least one variation of the surface stimulated versus time comprising one or more steps, either of increase of the aforesaid stimulated surface, or of decrease of the aforesaid stimulated surface, or of maintenance of the aforesaid stimulated surface, or a combination of whole or part of these steps, in order to transitorily modify the probability of deexcitation of some of said entangled trapped electrons on the surface stimulated.

9. Method according to claim 1 in which at least one said "characteristic profile" uses at least one variation of the volume stimulated versus time comprising one or more steps, either of increase of the aforesaid stimulated volume, or of decrease of the aforesaid stimulated volume, or of maintenance of the aforesaid stimulated volume, or a combination of whole or part of these steps, in order to transitorily modify the probability of deexcitation of some of said entangled trapped electrons on the volume stimulated.

10. Method according to claim 1 in which the temperature of at least one "slave" "entangled" sample measured in the "quantum receiver" is optimized, in order to optimize the response of deexcitation of the entangled traps of one or several aforesaid "slave" "entangled" samples at the time of the "quantum reception".

11. Method according to claim 1 in which one or several of the aforementioned "characteristic profile" applied, are of short durations, in order to reduce the rate of entangled traps which are deexcited during the application of one or several of the aforesaid "characteristic profiles", the aforementioned "characteristic profiles" being more particularly applicable to stimulation by photo deexcitation, either in a variation of the wavelength, or in a variation of the intensity, or in a variation of the surface, or by combinations of these stimulations.

12. Method to apply several times the method of claim 1, in which at least one same sample, called by convention "multi-slave" "entangled" sample, has been entangled successively with several samples or sets of samples, called by convention "mono-master" "entangled" samples, said "multi-slave" "entangled" sample or said "multi-slave" "entangled" samples and each of said "mono-master" "entangled" samples or each of said sets of "mono-master" "entangled" samples forming a group of "entangled" samples according to the method of claim 1, in which one repeats several times the method of claim 1, by using one after the other at least one of the aforesaid "mono-master" "entangled" samples as an aforesaid "master" "entangled" sample in the aforesaid "quantum transmitter", and at least one of the aforesaid "multi-slave" "entangled" samples as an aforesaid "slave" "entangled" sample in the aforesaid "quantum receiver", in order to carry out several determinations of transmission of information, by using successively the aforesaid "mono-master" "entangled" samples, while keeping in use the same aforesaid "multi-slave" "entangled" sample.

13. Method according to claim 1 in which one uses at least one aforementioned kind of photoluminescent material presenting at very low temperatures, ranging between −273° C. and 0° C., some properties of thermoluminescence.

14. Method according to claim 1 in which one calculates at least one moving average, possibly weighted, on a time window of a fraction of one or several aforesaid "characteristic profiles", in order to integrate or to minimize, either disturbances due to the noise of measurement (dark count), or disturbances due to the cosmic rays, or electromagnetic disturbances, or combinations of these disturbances, to optimize the signal of the response of at least one aforementioned "slave" "entangled" sample measured, during the variation of at least one aforementioned parameter of stimulation applied to at least one aforementioned "master" "entangled" sample.

15. Device of implementation of the method according to anyone of claim 1 or 3, characterized in that it includes at least one of the following apparatuses, insofar as it is intended to apply the part of the process, object of the aforesaid claim of process, located on the place covered by this patent, including the aircraft, the marine, underwater and space vessels, and the terrestrial, marine and space probes:

a) one or several aforementioned "quantum transmitters" equipment;
 b) one or several aforementioned "quantum receivers" equipment.

16. Method according to claim 1 in which the aforementioned kind of material is having properties of thermoluminescence, and the aforementioned stimulation is in a thermo-deexcitation mode.

17. Method according to claim 1 in which the aforementioned kind of material is having properties of photoluminescence, and the aforementioned stimulation is in a photo-deexcitation mode.

* * * * *